US011049347B2

(12) United States Patent
Kita et al.

(10) Patent No.: US 11,049,347 B2
(45) Date of Patent: Jun. 29, 2021

(54) GATE APPARATUS AND METHOD IN GATE APPARATUS

(71) Applicant: SONY CORPORATION, Tokyo (JP)

(72) Inventors: Masato Kita, Kanagawa (JP); Takashi Suzuki, Kanagawa (JP); Tsutomu Nakatsuru, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/642,125

(22) PCT Filed: Aug. 15, 2018

(86) PCT No.: PCT/JP2018/030356
§ 371 (c)(1),
(2) Date: Feb. 26, 2020

(87) PCT Pub. No.: WO2019/049623
PCT Pub. Date: Mar. 14, 2019

(65) Prior Publication Data
US 2020/0357213 A1 Nov. 12, 2020

(30) Foreign Application Priority Data
Sep. 6, 2017 (JP) ............................ JP2017-170982

(51) Int. Cl.
*G07C 9/29* (2020.01)
*G07C 9/00* (2020.01)
*H04W 4/02* (2018.01)

(52) U.S. Cl.
CPC .......... *G07C 9/29* (2020.01); *G07C 9/00182* (2013.01); *H04W 4/023* (2013.01)

(58) Field of Classification Search
CPC ....... H04W 4/25; H04W 4/027; H04W 4/029; H04W 4/33; H04W 64/00; H04W 4/023;
(Continued)

(56) References Cited

U.S. PATENT DOCUMENTS 5,293,645 A 3/1994 Sood
2002/0161675 A1* 10/2002 Kawase ............ G06Q 10/0875 705/29
(Continued)

FOREIGN PATENT DOCUMENTS

AU 2014342341 A1 4/2016
CA 2926474 A1 5/2015
(Continued)

OTHER PUBLICATIONS

International Search Report and Written Opinion of PCT Application No. PCT/JP2018/030356, dated Nov. 6, 2018, 10 pages of ISRWO.

*Primary Examiner* — Jean A Gelin
(74) *Attorney, Agent, or Firm* — Chip Law Group

(57) ABSTRACT

An automatic ticket examination system that enables tapless passage or an entry/exit system is achieved without a malfunction. There is provided a gate apparatus including a positioning unit that measures positions of a plurality of wireless communication terminals, and an authentication unit that performs authentication for determining whether or not each of the wireless communication terminals is permitted to pass through a gate on the basis of each of the positions of each of the wireless communication terminals which have been measured by the positioning unit. With this configuration, the automatic ticket examination system that enables tapless passage or the entry/exit system can be achieved without a malfunction.

20 Claims, 36 Drawing Sheets

(58) Field of Classification Search
CPC .......... G01S 5/14; G01S 5/021; G01S 5/0226; G01S 5/0284; G01S 13/878; G01S 5/02; G01S 5/04; G07C 2009/00769; G07C 2009/63; G07C 9/00182; G07C 9/00309; G07C 9/10; G07C 9/20; G07C 9/29; G07C 9/30
See application file for complete search history.

(56) References Cited

U.S. PATENT DOCUMENTS

2005/0253717 A1* 11/2005 Howarth .............. G06Q 10/087 340/572.1
2006/0163349 A1* 7/2006 Neugebauer ........... G06Q 30/02 235/383
2006/0244601 A1* 11/2006 Nishimura ......... G08B 13/2462 340/572.4
2007/0046428 A1* 3/2007 Mamaloukas .......... E05F 15/77 340/5.61
2008/0042840 A1* 2/2008 Christopher .......... H04W 4/029 340/572.1
2008/0204224 A1 8/2008 Yuba et al.
2009/0314833 A1 12/2009 Ruiz
2010/0102935 A1* 4/2010 Chaves ................. H04W 4/029 340/10.51
2015/0120558 A1 4/2015 Andrews et al.
2017/0169681 A1* 6/2017 Markaryan ........ G08B 13/2482
2018/0278700 A1* 9/2018 Diem .................... H04L 63/104
2019/0392543 A1* 12/2019 Bautista .................. H04W 4/40
2020/0096599 A1* 3/2020 Hewett ................. G01S 13/878
2020/0234337 A1* 7/2020 Fuju ................... G06K 9/00778

FOREIGN PATENT DOCUMENTS

EP 2138981 A2 12/2009
EP 3063742 A1 9/2016
JP 05-211470 A 8/1993
JP 2008-182566 A 8/2008
JP 2008-217074 A 9/2008
JP 2009-152825 A 7/2009
JP 2010-003271 A 1/2010
JP 2013-246513 A 12/2013
WO 2015/066191 A1 5/2015

* cited by examiner

ADVANCING DIRECTION
Gate_1
Gate_2
Gate_3
Gate_4
Gate_5
Gate_6
Gate_7
Gate_8
Space_1
Space_2
Space_3
Space_4
Space_5
Space_6
Space_7
Space_8
A2
100
200
300
150

START
ANCHOR 110
(Anchor1)
Tag1
Tag2
Tag3
Tag4
Tag50
POSITIONING COMMAND
Slot #0
Slot #1
Slot #2
Slot #31
FIRST TIME
POSITIONING RESPONSE:
PARAMETER (Tag_ID)
POSITIONING COMMAND
Slot #0
Slot #1
Slot #2
Slot #31
SECOND TIME
POSITIONING RESPONSE:
PARAMETER (Tag_ID)
CONTINUED TO FIG. 13

300
110 TO 120
200
120
Anchor_6
118
Anchor_5
116
Anchor_4
114
Anchor_3
112
Anchor_2
110
Anchor_1
A1
A2
A3
Gate_1
Gate_2
Gate_3
Gate_4
Gate_5
Gate_6
Gate_7
Gate_8
150
SERVER
1000

START
ANCHORS 110, 112, 114, 116, 118, AND 120
(Anchor1 TO 6)
Tag1 Tag2 Tag3 Tag4 • • • Tag50
Anchor 1 POSITIONING COMMAND
Slot #0
Slot #1
Slot #2
Slot #31
POSITIONING RESPONSE:
PARAMETER (Tag_ID)
Anchor 2 POSITIONING COMMAND
Slot #0
Slot #1
Slot #2
Slot #31
POSITIONING RESPONSE:
PARAMETER (Tag_ID)
CONTINUED TO DISTANCE MEASUREMENT AT Anchor 3

300
100
200
Gate_1
Gate_2
Gate_3
Gate_4
Gate_5
Gate_6
Gate_7
Gate_8
A2
100
150

100
130
134
Gate_1
Gate_2
Gate_3
Gate_4

100
130
136
Gate_1
Gate_2
Gate_3
Gate_4

TRANSMISSION
TRANSMISSION DATA
SPREAD CODE
TRANSFER SIGNAL
[1 0 0 1 0 1 1][1 0 0 1 0 1 1]
DEMODULATION
RECEPTION SIGNAL
SPREAD CODE
DEMODULATION DATA
[1 0 0 1 0 1 1][1 0 0 1 0 1 1]

TRANSMISSION
TRANSMISSION DATA
SPREAD CODE
TRANSFER SIGNAL
[1 0 0 1 1 1 0][1 0 0 1 1 1 0]
DEMODULATION
RECEPTION SIGNAL
SPREAD CODE
DEMODULATION DATA
[1 0 0 1 0 1 1][1 0 0 1 0 1 1]

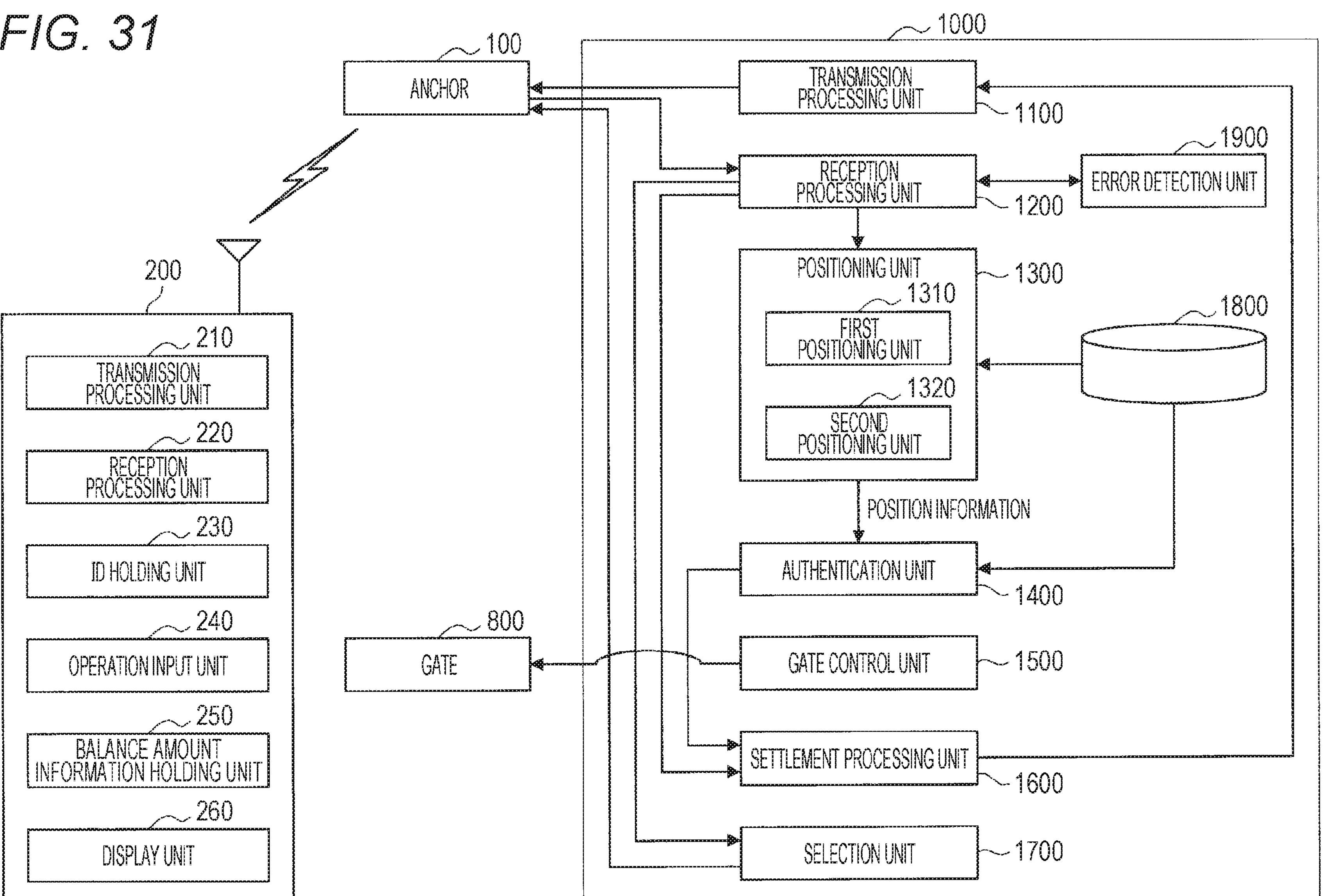
FIG. 31
100
ANCHOR
1000
TRANSMISSION PROCESSING UNIT
1100
RECEPTION PROCESSING UNIT
1200
1900
ERROR DETECTION UNIT
POSITIONING UNIT
1300
1310
FIRST POSITIONING UNIT
1320
SECOND POSITIONING UNIT
1800
POSITION INFORMATION
AUTHENTICATION UNIT
1400
800
GATE
GATE CONTROL UNIT
1500
SETTLEMENT PROCESSING UNIT
1600
SELECTION UNIT
1700
200
210
TRANSMISSION PROCESSING UNIT
220
RECEPTION PROCESSING UNIT
230
ID HOLDING UNIT
240
OPERATION INPUT UNIT
250
BALANCE AMOUNT INFORMATION HOLDING UNIT
260
DISPLAY UNIT

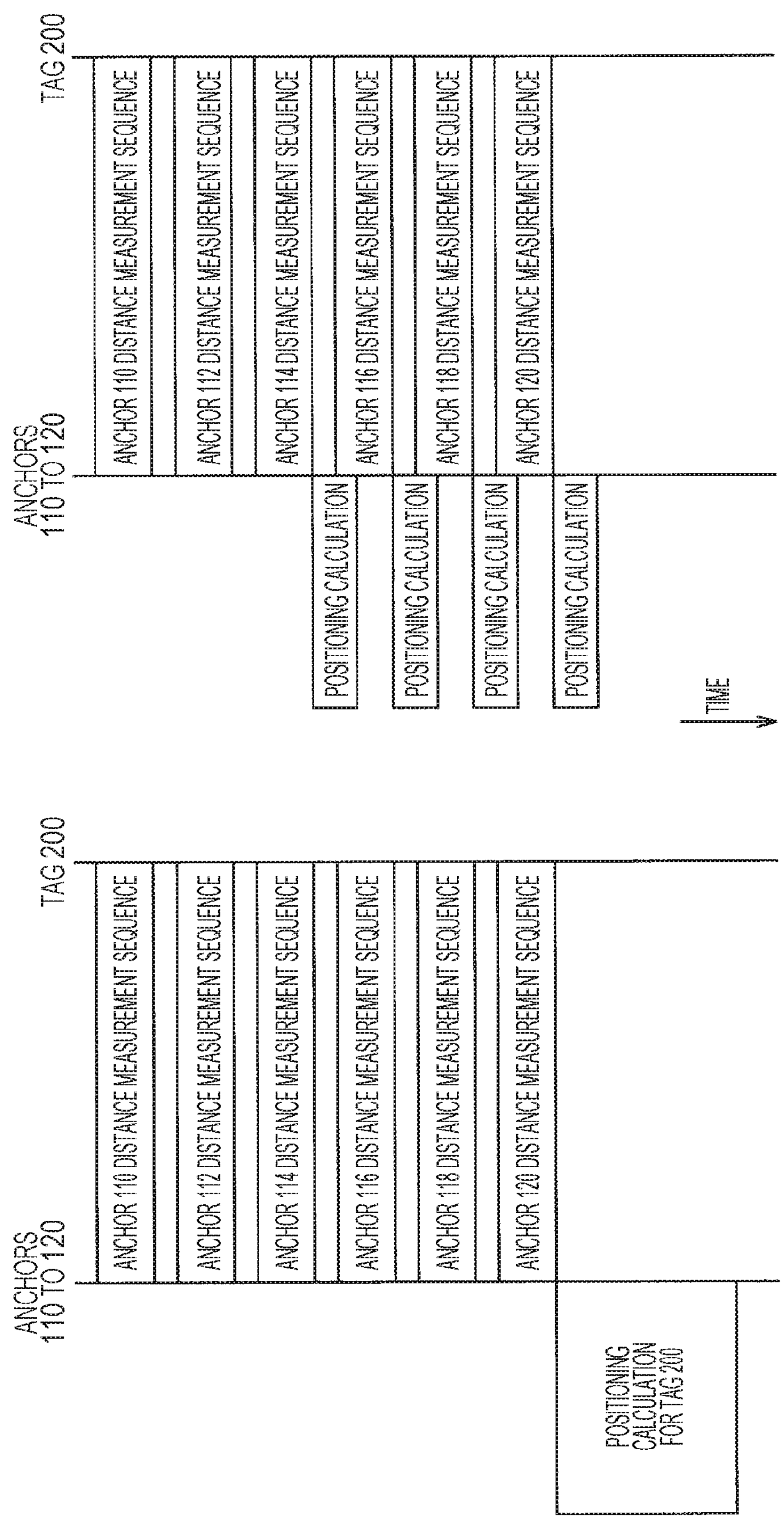
FIG. 33
TAG 200
ANCHORS 110 TO 120
ANCHOR 110 DISTANCE MEASUREMENT SEQUENCE
ANCHOR 112 DISTANCE MEASUREMENT SEQUENCE
ANCHOR 114 DISTANCE MEASUREMENT SEQUENCE
ANCHOR 116 DISTANCE MEASUREMENT SEQUENCE
ANCHOR 118 DISTANCE MEASUREMENT SEQUENCE
ANCHOR 120 DISTANCE MEASUREMENT SEQUENCE
POSITIONING CALCULATION
POSITIONING CALCULATION
POSITIONING CALCULATION
POSITIONING CALCULATION
TIME
TAG 200
ANCHORS 110 TO 120
ANCHOR 110 DISTANCE MEASUREMENT SEQUENCE
ANCHOR 112 DISTANCE MEASUREMENT SEQUENCE
ANCHOR 114 DISTANCE MEASUREMENT SEQUENCE
ANCHOR 116 DISTANCE MEASUREMENT SEQUENCE
ANCHOR 118 DISTANCE MEASUREMENT SEQUENCE
ANCHOR 120 DISTANCE MEASUREMENT SEQUENCE
POSITIONING CALCULATION FOR TAG 200

300
100
300
120
Anchor_6
118
Anchor_5
116
Anchor_4
Anchor_3
114
Anchor_2
112
Anchor_1
110
A1
A4
A2
Gate_1
Gate_2
Gate_3
Gate_4
Gate_5
Gate_6
Gate_7
Gate_8
150
1000
SERVER FIG. 36
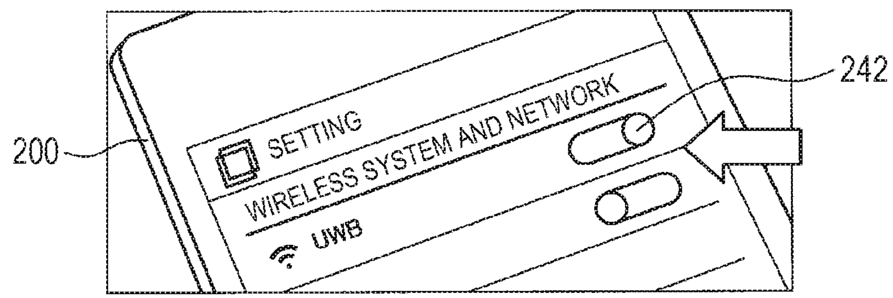
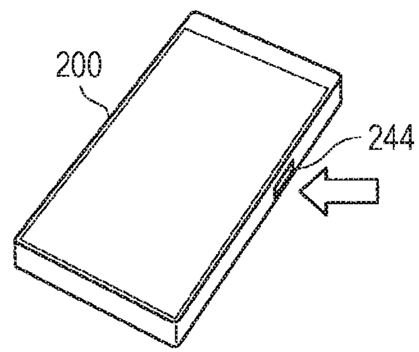
FIG. 37
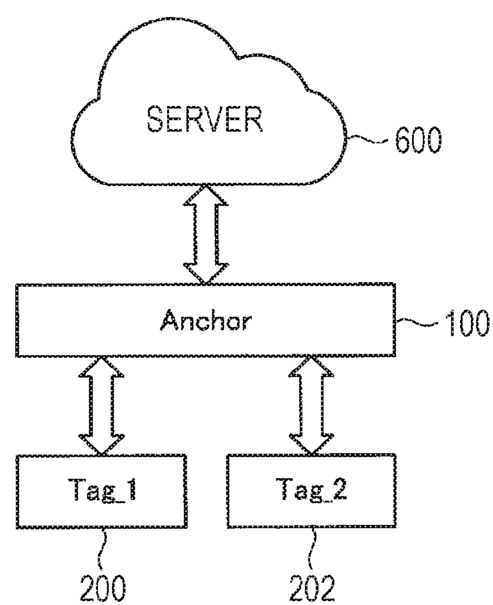

FIG. 41
TRANSMISSION DATA "1" "0" "1" "0"
DIRECT WAVE
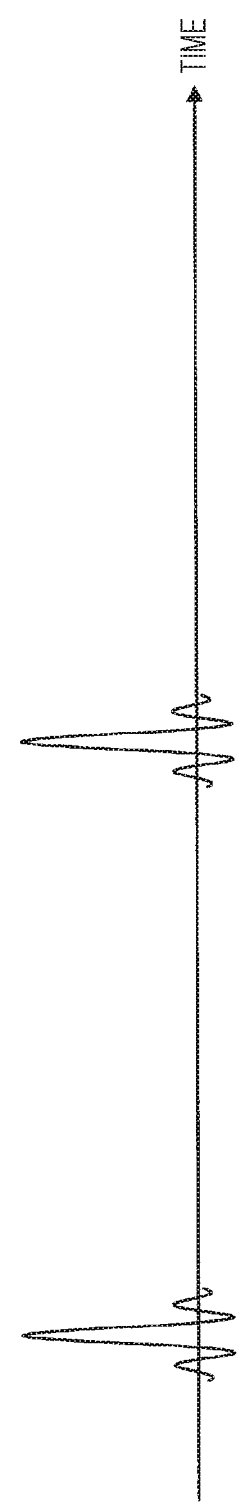
REFLECTED WAVE
Δt=Δd/ LIGHT SPEED
TIME
RECEPTION WAVEFORM
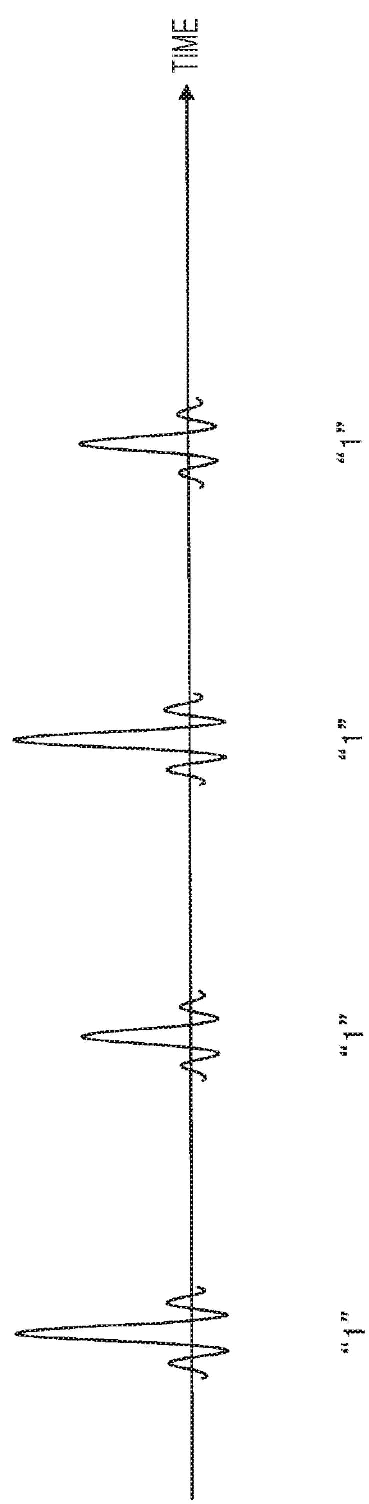
RECEPTION DATA

GATE APPARATUS AND METHOD IN GATE APPARATUS

CROSS REFERENCE TO RELATED APPLICATIONS

This application is a U.S. National Phase of International Patent Application No. PCT/JP2018/030356 filed on Aug. 15, 2018, which claims priority benefit of Japanese Patent Application No. JP 2017-170982 filed in the Japan Patent Office on Sep. 6, 2017. Each of the above-referenced applications is hereby incorporated herein by reference in its entirety.

TECHNICAL FIELD

The present disclosure relates to a gate apparatus and a method in the gate apparatus.

BACKGROUND ART

Conventionally, for example, Patent Document 1 below discloses a contactless automatic ticket examination system.

CITATION LIST

Patent Document

Patent Document 1: Japanese Patent Application Laid-Open No. 2001-148038

SUMMARY OF THE INVENTION

Problems to be Solved by the Invention

In the automatic ticket examination system as disclosed in Patent Document above, if a contactless card is held over a ticket examination machine, whether or not the entry is permitted is determined. In a case where the entry is permitted, a door of the ticket examination area is opened.

In contrast, a tapless ticket examination system that enables passage through a ticket examination area without holding a card is conceivable. In this system, however, the communication distance between a ticket examination machine and a device (tag) held by a user needs to be increased. As a result of increasing the communication distance, it is assumed that a gate different from a gate to be passed through, for example, a next gate is opened.

Here, "tapless" includes not touching a reader/writer unit of a ticket examination machine with an IC ticket and not performing holding operation.

Then, the achievement of an automatic ticket examination system that enables tapless passage without a malfunction has been required.

Solutions to Problems

According to the disclosure, there is provided a gate apparatus including: a positioning unit that measures positions of a plurality of wireless communication terminals; and an authentication unit that performs authentication for determining whether or not each of the wireless communication terminals is permitted to pass through a gate on the basis of each of the positions of each of the wireless communication terminals which have been measured by the positioning unit.

Furthermore, according to the disclosure, there is provided a method in a gate apparatus, the method including: measuring positions of a plurality of wireless communication terminals; and performing authentication for determining whether or not each of the wireless communication terminals is permitted to pass through a gate on the basis of each of the positions of each of the wireless communication terminals which have been measured.

Effects of the Invention

According to the disclosure, an automatic ticket examination system that enables tapless passage without a malfunction can be achieved.

Note that the above-described effect is not necessarily limited, and, along with or in place of the above-described effect, any of the effects illustrated in the present specification, or other effects that can be grasped from the specification may be exhibited.

BRIEF DESCRIPTION OF DRAWINGS

FIG. 31 is a block diagram illustrating an example of a function and configuration of an automatic ticket examination system.

FIG. 33 is a schematic diagram illustrating an example in which positioning calculation is sequentially performed in parallel with command transmission.

FIG. 36 is a schematic diagram illustrating an example in which a communication function is turned on/off.

FIG. 37 is a schematic diagram illustrating a method of collectively managing a balance amount on a server.

FIG. 41 is a schematic diagram illustrating direct waves and reflected waves received at a tag in a case where an anchor transmits transmission data.

MODE FOR CARRYING OUT THE INVENTION

A preferred embodiment of the disclosure will be described in detail below with reference to the accompanying drawings. Note that, in the specification and the drawings, the same signs are attached to the components having substantially the same functional configuration, and redundant description will be omitted.

Note that the description will be given in the following order.

1. Background
2. Technology (UWB) for Achieving Indoor High-precision Positioning
2.1. Outline of Positioning Principle
2.2. Positioning Technology for Achieving Tapless Ticket Examination
2.3. UWB Positioning Technology
3. Communication Protocol Including Positioning
3.1. Outline
3.2. Communication Protocol in Case of Controlling Positioning for Entire Ticket Examination Area
3.2.1. Protocol in Case Where Only High-Precision Positioning Is Used
3.2.2. Combination of Low-Precision Positioning and High-Precision Positioning
3.2.3. Protocol in Case Where Tag ID Is Collected in Advance
3.2.4. Authentication Communication
3.2.5. Method for Improving Communication Performance
3.2.6. Handling for Counter Next to Ticket Examination Area
3.3. Communication Protocol in Case of Performing Control for Each Gate
3.3.1. Protocol
3.3.2. Resistance against RF Packet Collision
3.3.3. System in Case of Assuming That Packet Collision Is Tolerated
4. Example of Function and Configuration of Automatic Ticket Examination System
5. Further Variations of Embodiment
5.1. Application to Other than Ticket Examination Area
5.2. Example of Performing Positioning Calculation in Parallel with Command Transmission
5.3. Example in which State Transition of Tag Is Restored
5.4. Method of Subtracting Balance Amount of Tag after Passage through Gate
5.5. Measure for Preventing Double Charge
5.6. Countermeasure against Reflected Wave of UWB
5.7. Countermeasure against Distance Measurement Error
5.8. Policy for Improving Positioning Precision

1. Background

First, problems in achieving tapless ticket examination by known technology (e.g., Wi-Fi, Bluetooth (registered trademark), and RFID) and a method for solving the problems will be described. In order to achieve the tapless ticket examination by wireless communication, wireless technology capable of securing a longer communication distance is needed instead of communication technology based on NFC (communication distance of approximately 10 cm), which is currently used at ticket examination areas.

Figure 1:
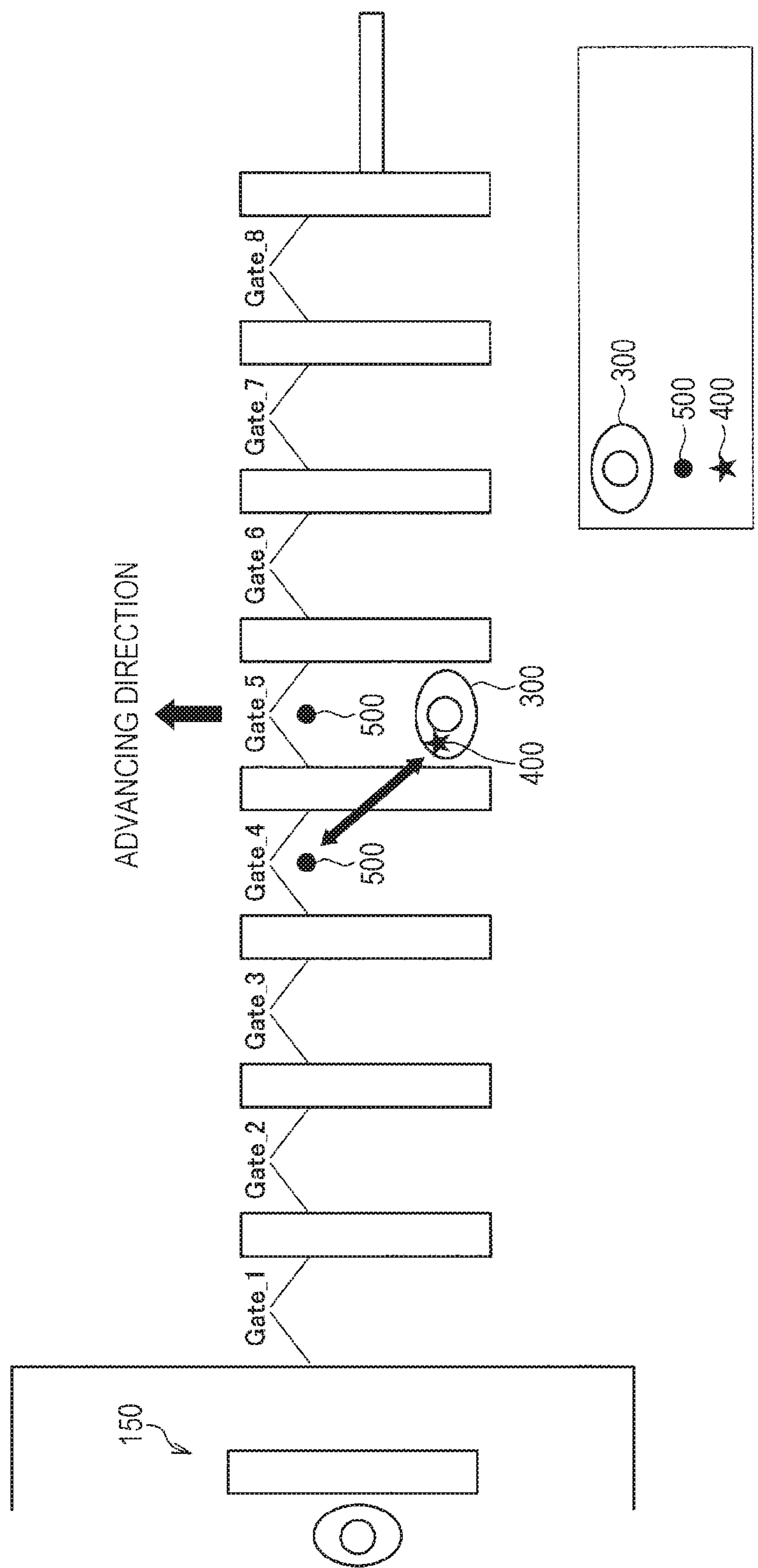
FIG. 1 is a schematic diagram illustrating a ticket examination area as seen from above.

Here, description will be given assuming that currently and generally used technology capable of securing a communication distance of 1 to 10 m, such as Wi-Fi, Bluetooth (registered trademark), and RFID, is applied. FIG. 1 is a schematic diagram illustrating a ticket examination area as seen from above. As illustrated in FIG. 1, the ticket examination area includes eight gates (Gate_1 to Gate_8). As illustrated in FIG. 1, a person 300 passing the ticket examination area holds a tapless device 400. The tapless device 400 communicates with a gate installed device 500 installed for each gate. In a case of successful authentication, a gate opens.

In the case, it is assumed that, as illustrated in FIG. 1, a communication distance increased by, for example, excessively propagating radio waves causes the gate installed device 500 of a gate different from a gate to be passed to communicate with the tapless device 400, whereby the unintended gate is opened. For example, despite the fact that the person 300 tries to pass through Gate_5 illustrated in FIG. 1, the tapless device 400 held by the person 300 who tries to pass through the ticket examination area may possibly communicate with the gate installed device 500 installed in Gate_4, and Gate_4 may be opened.

Thus, adjusting the radio wave intensity of a device installed at a specific gate for matching the communication distance only to the gate is conceivable as a solution. Unfortunately, the directivity of an antenna of a tag held by a person and environmental changes such as temperature and humidity change an intended communication distance in this method. For this reason, it is predictable that excessively propagating radio waves as described above causes another gate to be opened or poor communication due to shortened communication distance causes a target gate not to be opened.

In order to solve the problems as described above, the present inventors first assumed the following two methods.

Figure 2:
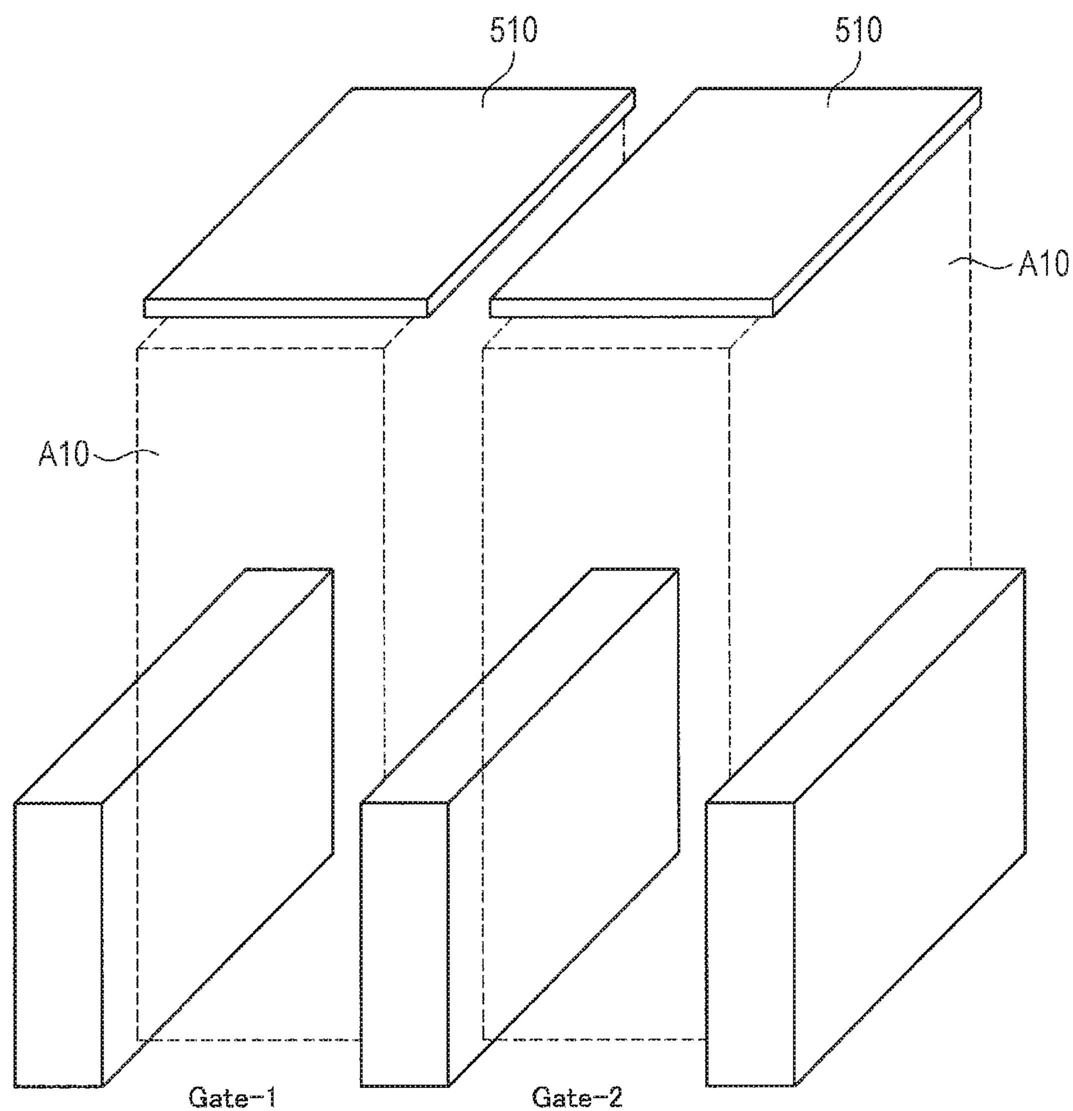
FIG. 2 is a schematic diagram illustrating a method of narrowing a radiated-radio-wave range A10 from an antenna of a gate installed device for each gate.

1. Give directivity to an antenna of a device installed at a gate, and narrow a radiated-radio-wave range to a specific region. As illustrated in FIG. 2, a radiated-radio-wave range A10 from an antenna 510 of the gate installed device 500 is narrowed for each gate in this method.

Figure 3:
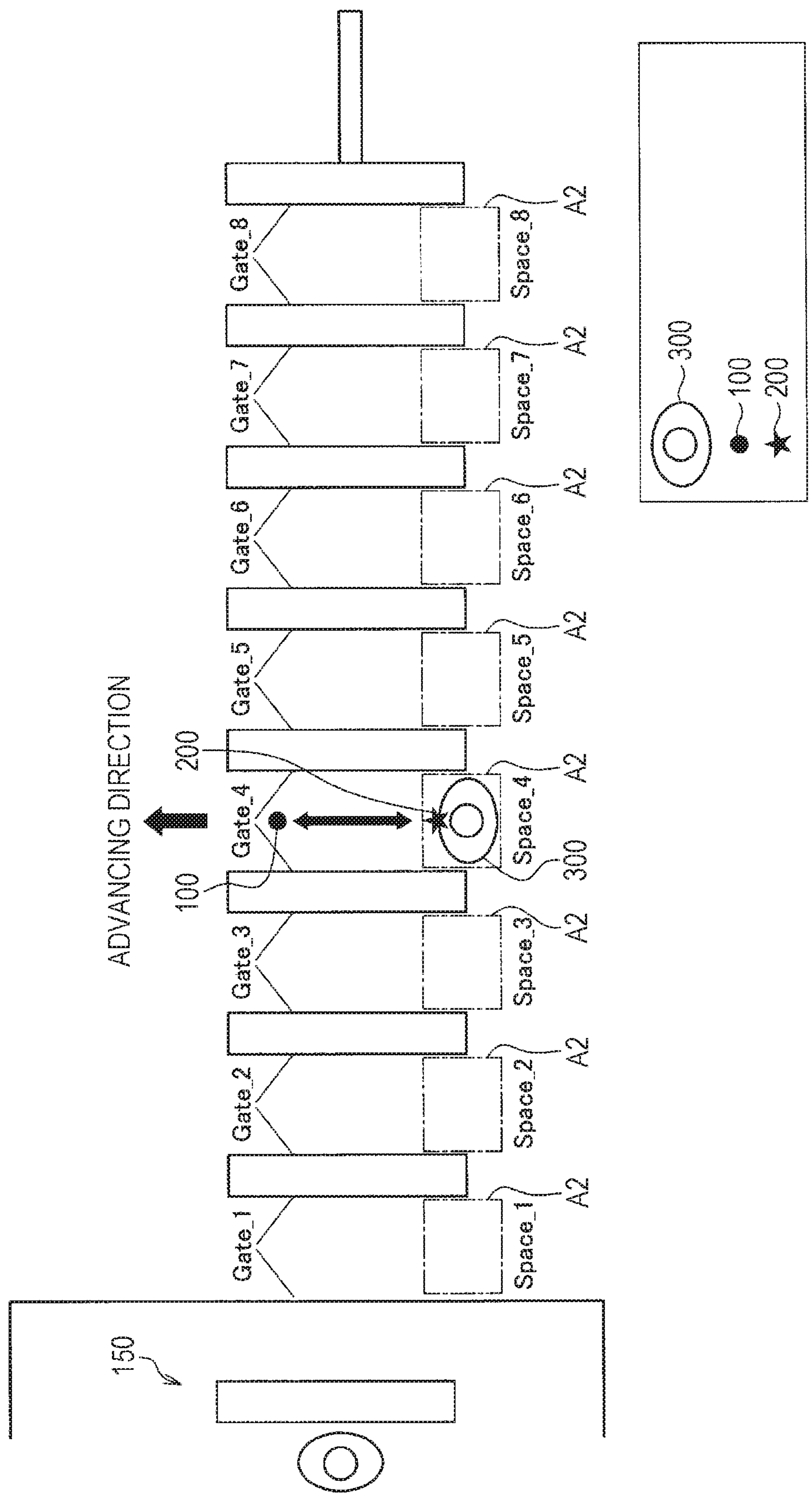
FIG. 3 is a schematic diagram illustrating the ticket examination area as seen from above.

2. Confirm intention of a person holding a tag to pass through a gate by positioning technology, and perform authentication communication in a case where the intention to pass through the gate can be confirmed. As illustrated in FIG. 3, the intention of a passenger to pass through a gate is confirmed by detecting that a tag 200 held by the person enters predetermined space (region A2 surrounded by a dot dashed line) corresponding to each gate by the positioning technology in this method. Then, authentication communication is performed to open the gate corresponding to the space.

A system and a communication protocol for achieving the above-described method of "2." will be described in the embodiment described below.

2. Technology (UWB) for Achieving Indoor High-Precision Positioning

The outline of a positioning principle and technology (UWB) for achieving indoor high-precision positioning will be described below.

2.1. Outline of Positioning Principle

Figure 4:
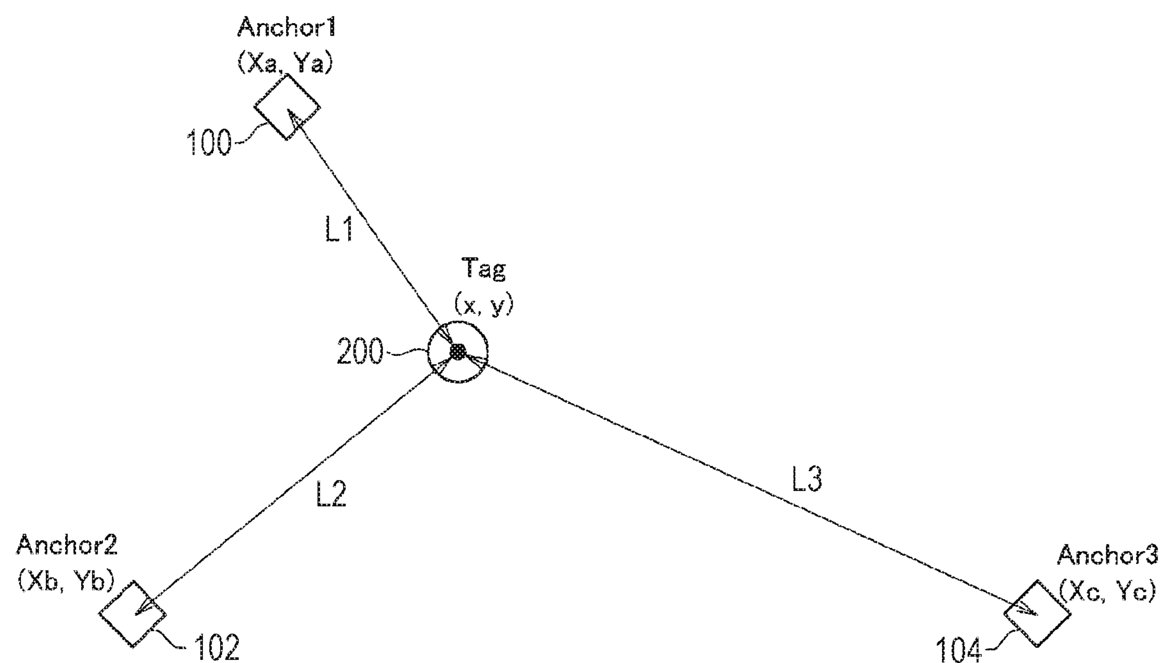
FIG. 4 is a schematic diagram for illustrating a principle of determining the coordinates of a tag by using three anchors.

First, the principle of determining the coordinates (x, y) of the tag 200 by using three anchors 100, 102, and 104 as illustrated in FIG. 4 will be described. Note that the respective coordinates (Xa, Ya), (Xb, Yb), and (Xc, Yc) of the anchors 100, 102, and 104 are already known. Note that the anchors are apparatuses (wireless communication apparatus) installed in a ticket examination area, and the tag is a device (wireless communication terminal) held by a person who passes through the ticket examination area. The tag may be a mobile device such as a mobile phone or a smartphone.

Figure 5:
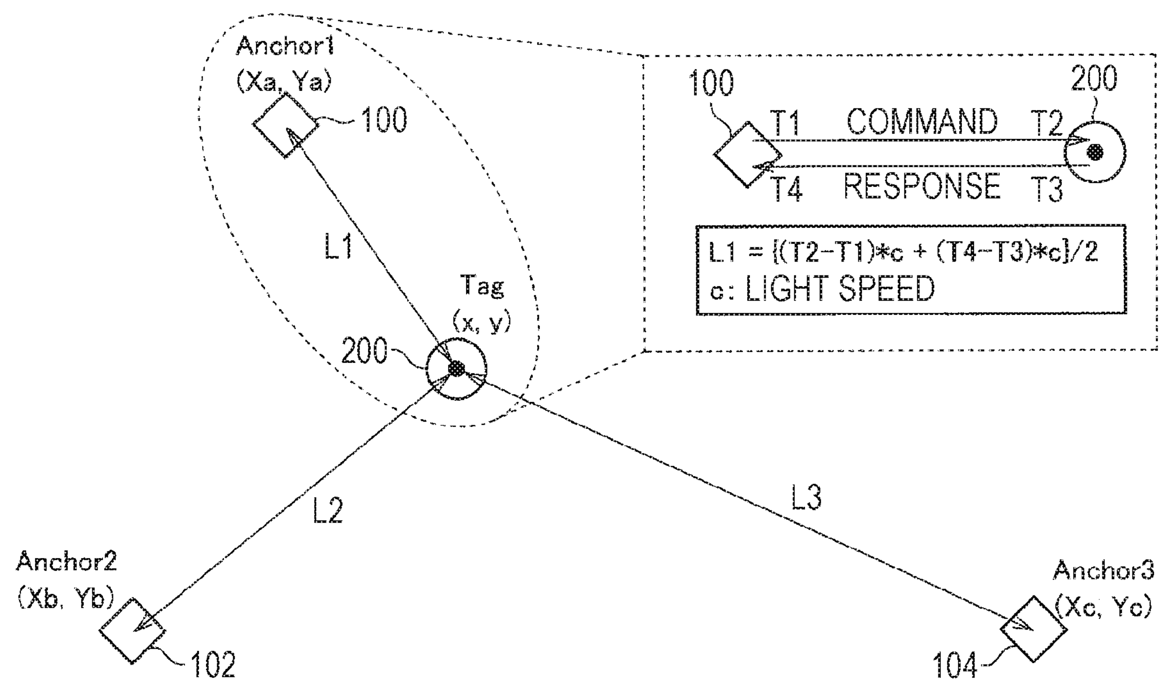
FIG. 5 is a schematic diagram for illustrating the principle of determining the coordinates of a tag by using three anchors.
Figure 6:
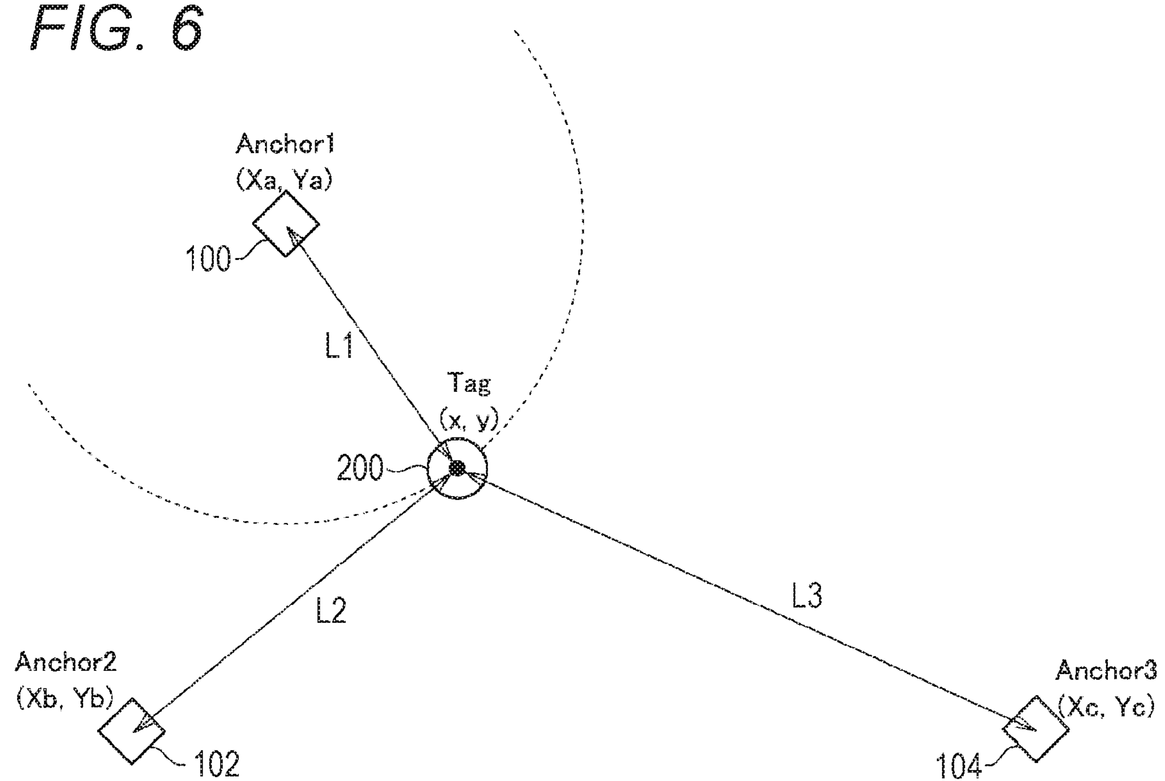
FIG. 6 is a schematic diagram for illustrating the principle of determining the coordinates of a tag by using three anchors.

First, attention is paid to the anchor 100 and the tag 200 as illustrated in FIG. 5. Communication is performed between the anchor 100 and the tag 200. A command is transmitted from the anchor 100 to the tag 200. A response is returned from the tag 200 to the anchor 100. A command transmission time of the anchor 100, a command reception time of the tag 200, a response transmission time of the tag 200, and a response reception time of the anchor 100 are defined as T1, T2, T3, and T4, respectively. Here, a distance L1 between the anchor 100 and the tag 200 can be determined by multiplying transfer time of the command and the response (T2−T1 and T4−T3) by a light speed c and dividing the sum by two. This means, for the anchor 100, that the tag 200 is placed on a circle having a radius of the distance L1 as illustrated in FIG. 6.

Figure 7:
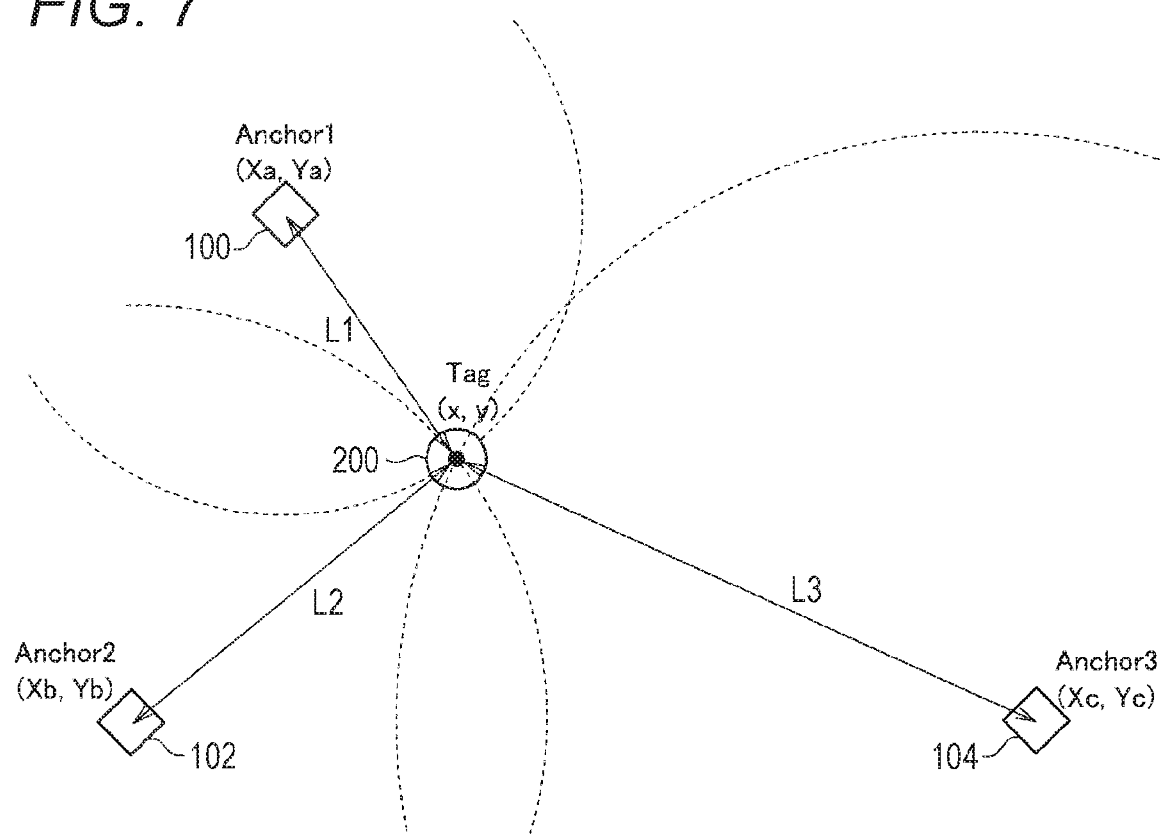
FIG. 7 is a schematic diagram for illustrating the principle of determining the coordinates of a tag by using three anchors.

Next, the calculation described with reference to FIG. 5 is also performed for the anchors 102 and 104. A distance L2 between the anchor 102 and the tag 200 and a distance L3 between the anchor 104 and the tag 200 are determined. Then, as illustrated in FIG. 7, circles having radii of the distances L2 and L3 are drawn for the anchors 102 and 104. A part (intersection) where three circles overlap is the position of the tag 200 to be determined.

As described above, the position of a tag can be detected by communication between at least three anchors and the tag. Increasing the number of anchors that communicate with a tag can enhance precision of position detection.

2.2. Positioning Technology for Achieving Tapless Ticket Examination

The most representative technology for achieving positioning is GPS. Unfortunately, GPS is difficult to apply to the above-described tapless ticket examination since, for example, GPS is unsuitable for indoor positioning and has precision in meters.

Roofs are placed over ticket examination areas. Indoor positioning ability is essential for achieving the tapless ticket examination using positioning technology. Furthermore, positioning precision in approximately several tens of centimeters is necessary. Technology that satisfies the conditions includes ultra wide band (UWB). The reason why high-precision positioning can be performed by UWB will be described below.

2.3. UWB Positioning Technology

UWB means an ultra-wide band wireless system. UWB is characterized by performing positioning with very short pulse signals of approximately one nanosecond. Advantages of using pulse signals will be described with reference to FIGS. 8, 9, and 10. Note that the propagation time of a radio wave is calculated by a time lag between peaks of pulses.

Figure 8:
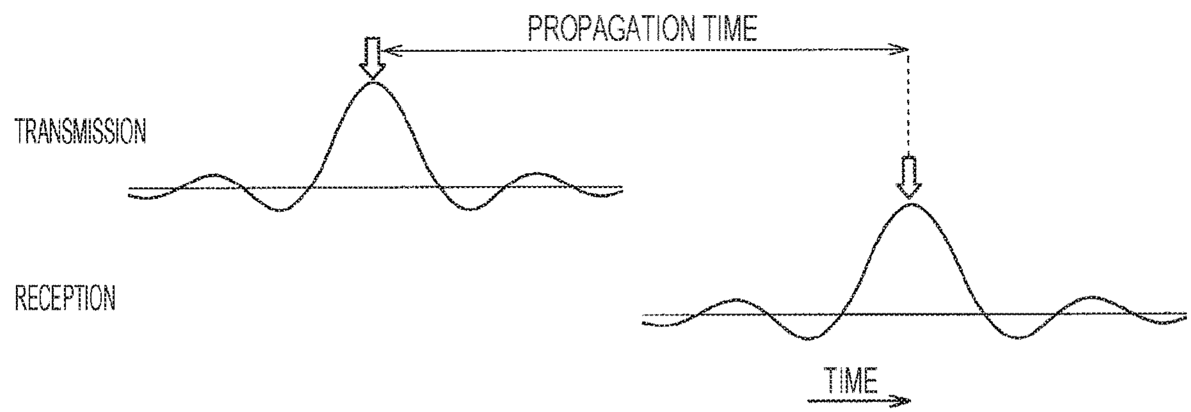
FIG. 8 is a schematic diagram for illustrating an advantage of using a pulse signal in UWB.
Figure 9:
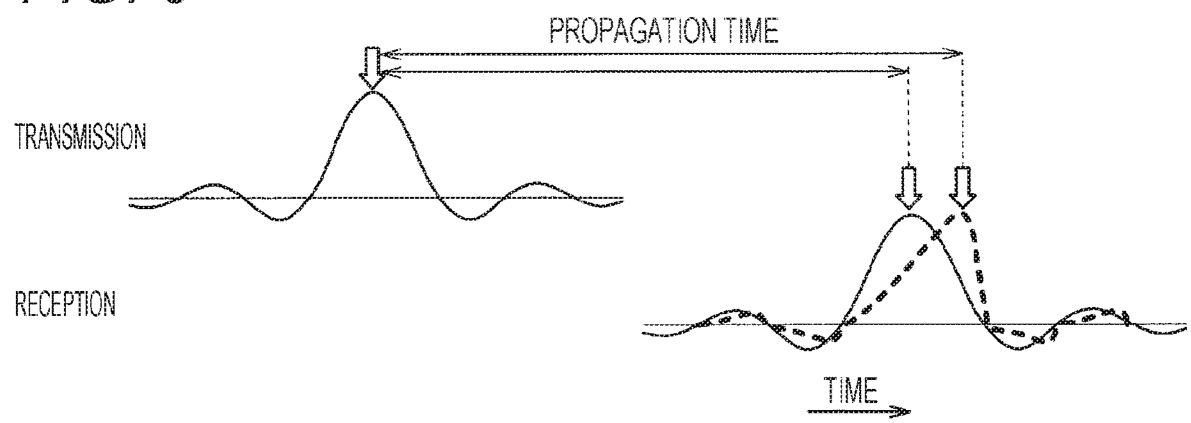
FIG. 9 is a schematic diagram for illustrating the advantage of using a pulse signal in UWB.

FIGS. 8 and 9 illustrate a transmission waveform and a reception waveform that have a wide pulse width. As illustrated in FIG. 8, in an ideal state, no noise occurs during transmission and reception of radio waves, and the transmission waveform and the reception waveform is exactly the same. Consequently, propagation time can be determined from the time lag between the peaks of pulses of the transmission waveform and the reception waveform. Noises, however, occur in reality, and the reception waveform is different from the transmission waveform as indicated by a dashed line in FIG. 9. Consequently, the peak of the reception waveform is different from that in the ideal state, and the propagation time cannot be accurately determined. Here, since the propagation time is multiplied by the light speed in calculating a distance, a propagation time lag of one nanosecond causes an error of 30 cm.

Figure 10:
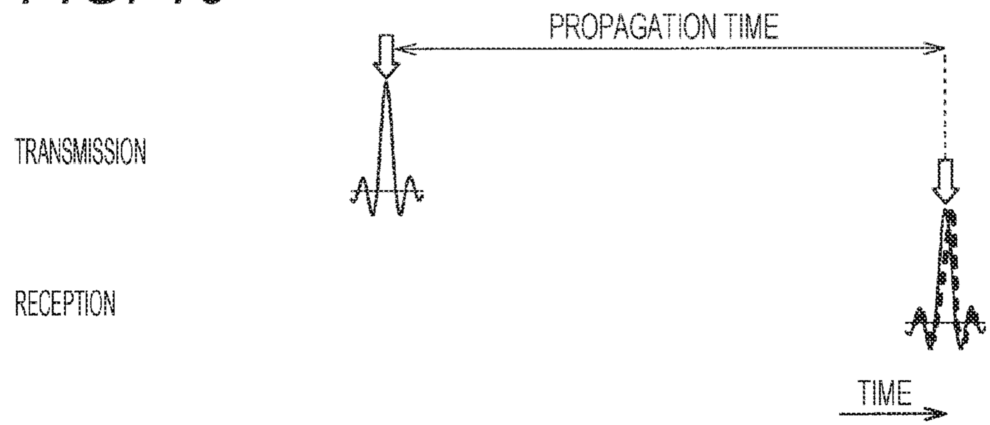
FIG. 10 is a schematic diagram for illustrating the advantage of using a pulse signal in UWB.

In contrast, as illustrated in FIG. 10, a narrow pulse width reduces the propagation time lag in a noisy environment, and enables high-precision positioning. The advantage of using UWB is that a pulse signal having a very short pulse width as illustrated in FIG. 10 enables accurate distance measurement even in noisy environments.

3. Communication Protocol Including Positioning

A protocol for achieving the tapless ticket examination will be described below.

3.1. Outline

Two communication protocols in a case of controlling the positioning for an entire ticket examination area and in a case of controlling the positioning for each gate will be described. First, an anchor and a tag will be defined. An anchor transmits a command for distance measurement and authentication for a tag. The tag transmits a response to the command received from the anchor for positioning and authentication. Note that, in NFC, the anchor corresponds to a reader/writer (RW) and the tag corresponds to, for example, a card and a mobile device.

In the embodiment, only UWB is used as a physical layer of communication. That is, the same frequency band is used for positioning and authentication communication. Since RF packets collide, communication at the same time by dividing a frequency domain cannot be performed for the positioning and the authentication communication. Communication can be performed only sequentially on a time domain. In a basic sequence, a sequence of positioning and authentication is repeated, for example, positioning communication to authentication communication to positioning communication to authentication communication. Time of Arrival-2way method described with reference to FIGS. 4 to 7 is used as an approach of distance measurement. Here, in the distance measurement, time from command reception to response transmission of a tag, that is, command processing time in the tag is fixed, and the anchors know the specification in advance. That is, time information is not communicated in a command and a response.

Figure 11:
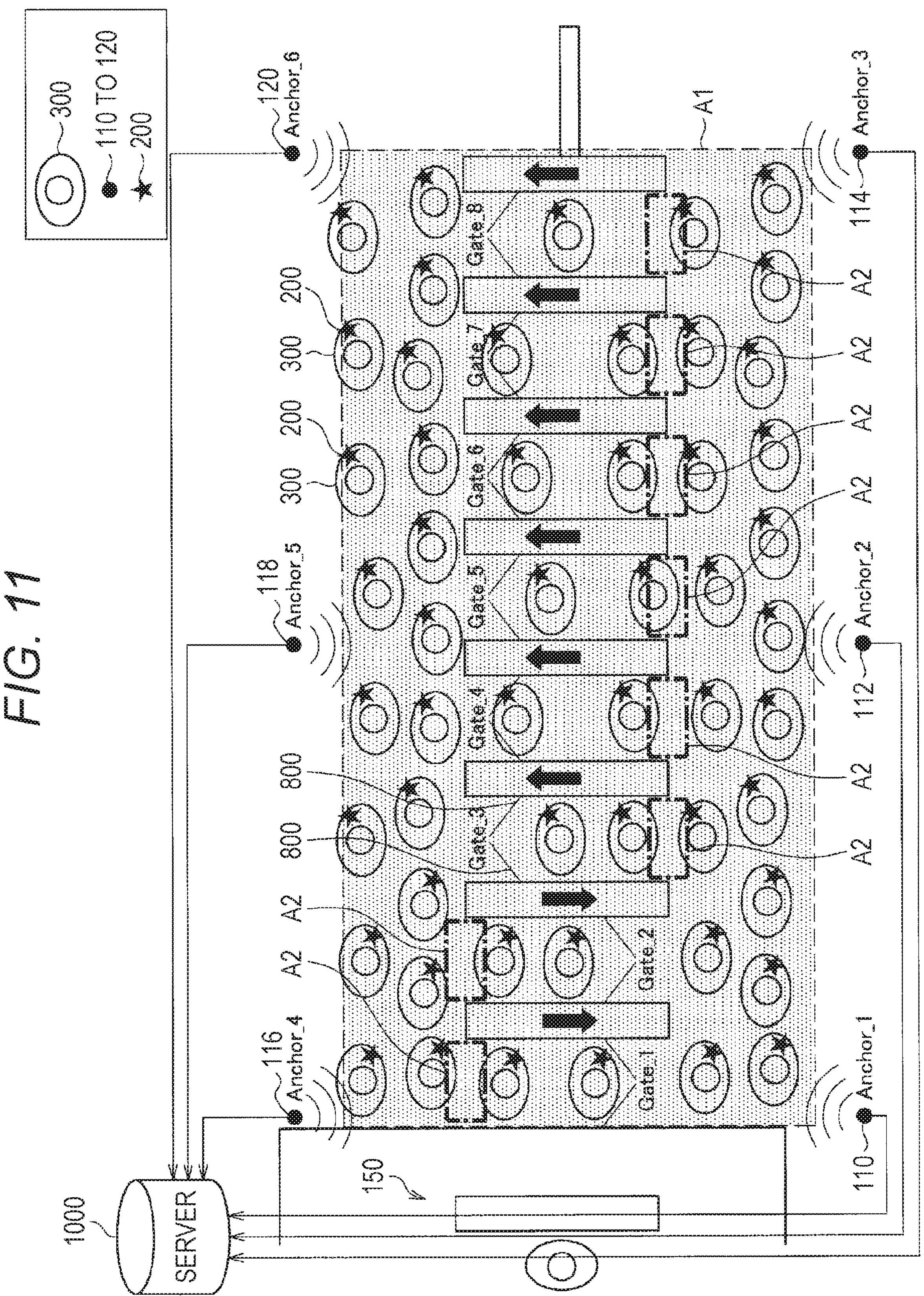
FIG. 11 is a schematic diagram illustrating the ticket examination area as seen from above.

3.2. Communication Protocol in a Case of Controlling Positioning for Entire Ticket Examination Area A communication protocol in a case of controlling the positioning for an entire ticket examination area will be described. FIG. 11 is a schematic diagram illustrating a ticket examination area as seen from above. FIG. 11 illustrates the person 300, who holds the tag 200, near the ticket examination area. The ticket examination area illustrated in FIG. 11 includes eight gates (Gate_1 to Gate_8). People pass through the right six gates (Gate_3 to Gate_8) from below to above in the figure. People pass through the left two gates (Gate_1 and Gate_2) from above to below in the figure. Furthermore, in FIG. 11, for example, six anchors 110, 112, 114, 116, 118, and 120 handle the entire ticket examination area, and approximately 50 tags 200 within a communication range are addressed. Note that a region A1 surrounded by a dashed line corresponds to the communication range, and the region A2 surrounded by a dot dashed line corresponds to an authentication intention detection position. The anchors 110, 112, 114, 116, 118, and 120 detect a tag in the region A2, which corresponds to the authentication intention detection position, and perform authentication communication for the tag to determine whether or not to open or close a gate.

3.2.1. Protocol in Case where Only High-Precision Positioning is Used

Figure 12:
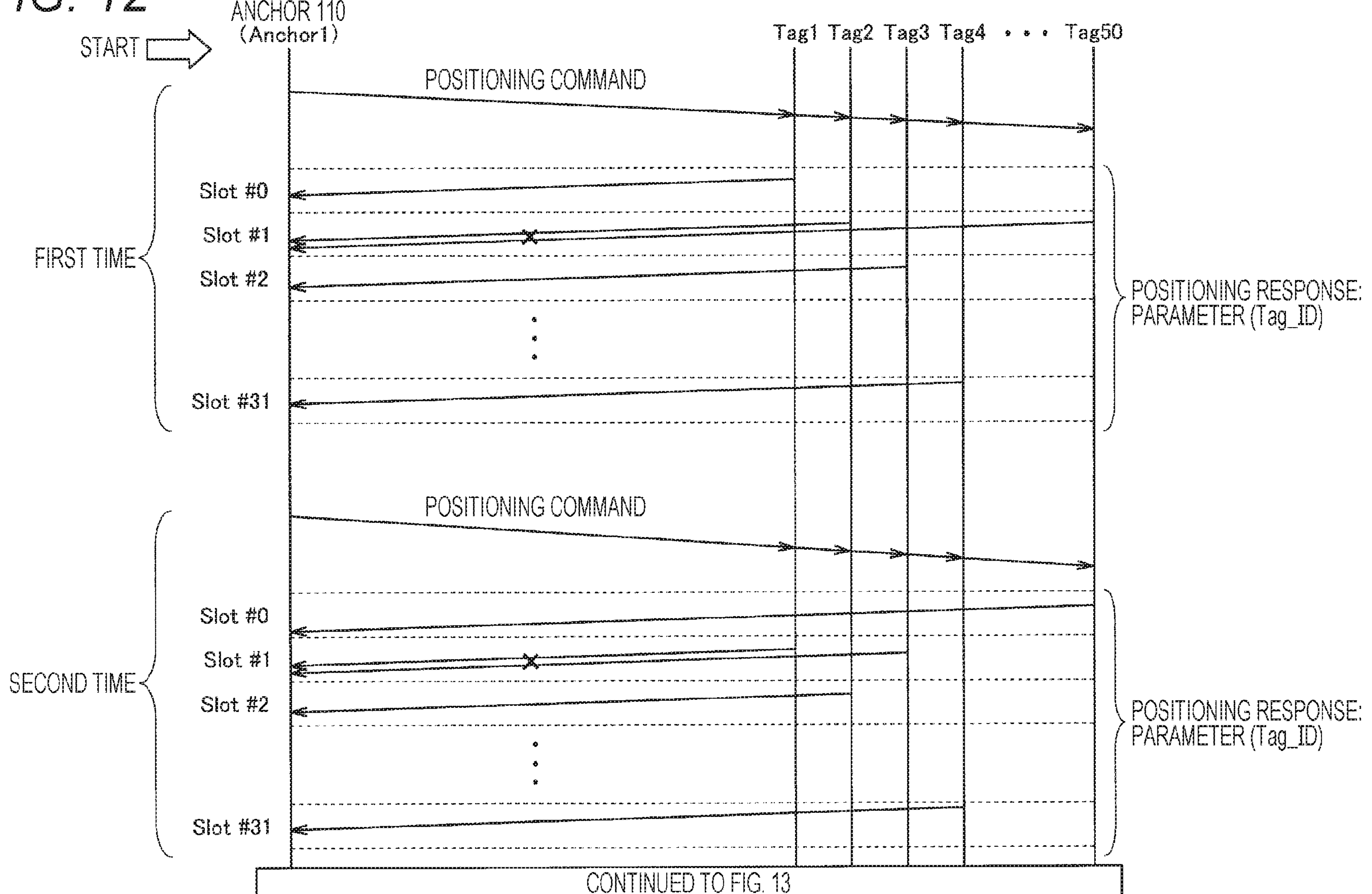
FIG. 12 is a schematic diagram illustrating a case where only high-precision positioning is used.
Figure 13:
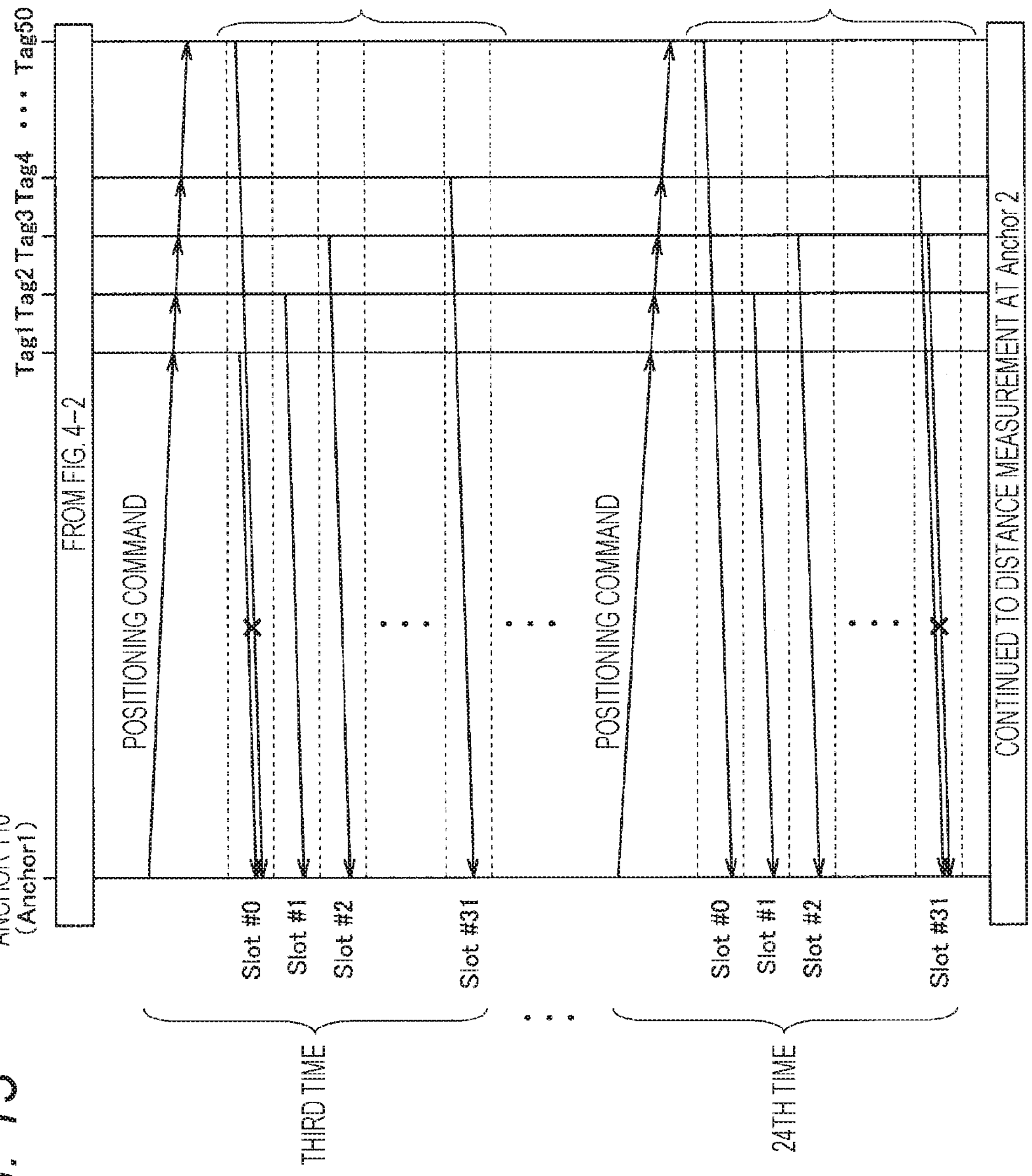
FIG. 13 is a schematic diagram illustrating the case where only high-precision positioning is used.

Here, a communication protocol in a case where only high-precision positioning (fine positioning) is used will be described. FIGS. 12 and 13 are sequence diagrams illustrating a case where only high-precision positioning is used. Here, a case where the anchor 110 communicates with 50 tags (Tags 1 to 50) will be described. As illustrated in FIG. 12, first, the anchor 110 transmits a distance measurement command. Thereafter, the anchor 110 waits for responses at each time slot timing. Here, the number of slots for the responses to the distance measurement command is set to 32. The reason for providing the time slots is to reduce the probability of collision of response packets from the tag 200. Each tag that has received the distance measurement command randomly determines the timing of a slot to which return is to be performed, and transmits a response together with the tag ID of the tag.

Next, the anchor 110 performs the above-described command-response sequence multiple times. As illustrated in FIG. 13, here, 24 times of command-response sequences are performed. The reason for performing multiple times of command-response sequences is to increase precision of distance measurement. For example, computing an average value of distance measurement values in the 24 times of command-response sequences can further enhance the precision. Furthermore, the reason is to ensure that positioning can be performed even if packet collision occurs. For example, in the first sequence of FIG. 12, the response of the tag 2 collides with that of the tag 50. The sequences of 24 times enable accurate positioning for each tag even if a collision occurs.

The more the number of sequences is, the higher-precision distance measurement can be performed. It is, however, assumed that the increased number of sequences increases communication time for positioning and time for authentication communication cannot be secured. Thus, the number of sequences is desirably set in consideration of this point.

Thereafter, the anchors 112, 114, 116, 118, and 120 sequentially perform the same operation. Here, all pieces of information from the anchors 110, 112, 114, 116, 118, and 120 are not necessarily needed for positioning. The positioning can be performed as long as information from a minimum of three anchors is available. The more the number of pieces of distance measurement information is, that is, the more the number of anchors is, the higher the precision is. Note, however, that, as in the above-described situation, the increased number of anchors increases communication time for distance measurement and time for authentication communication cannot be secured. The number of anchors is desirably determined in consideration of this point. After each anchor performs distance measurement, authentication communication is performed for a tag whose presence in the authentication intention detection position (region A2 in FIG. 11) has been confirmed by positioning. Therefore, authentication communication is not performed for all tags, and a load of communication can be significantly reduced.

The advantage of the above-described method using only high-precision positioning is that control of a protocol is simple compared to a later-described method using high-precision positioning and low-precision positioning. It is, however, undeniable at the same time that collision of response packets may cause some tags to be undetectable.

Possible countermeasures to this disadvantage include an increase in the number of slots, the number of command-response sequences at each anchor, and the number of anchors. That is, the method reduces the probability of missing due to the packet collision by increasing the number of command-response sequences. In contrast, in this approach, distance measurement communication time is increased, and time for authentication communication may fail to be secured.

Furthermore, in a case where the number of slots is increased, the precision of distance measurement may be lowered. Specifically, in a case where an error occurs between frequencies of crystal oscillators of an anchor and a tag, the larger the number of time slots is, the more the error is accumulated, leading to increase in a distance measurement error. As a countermeasure, the response timing of a tag is randomized, and averaging is performed multiple times. Precision of a certain degree can thereby be secured.

Figure 14:
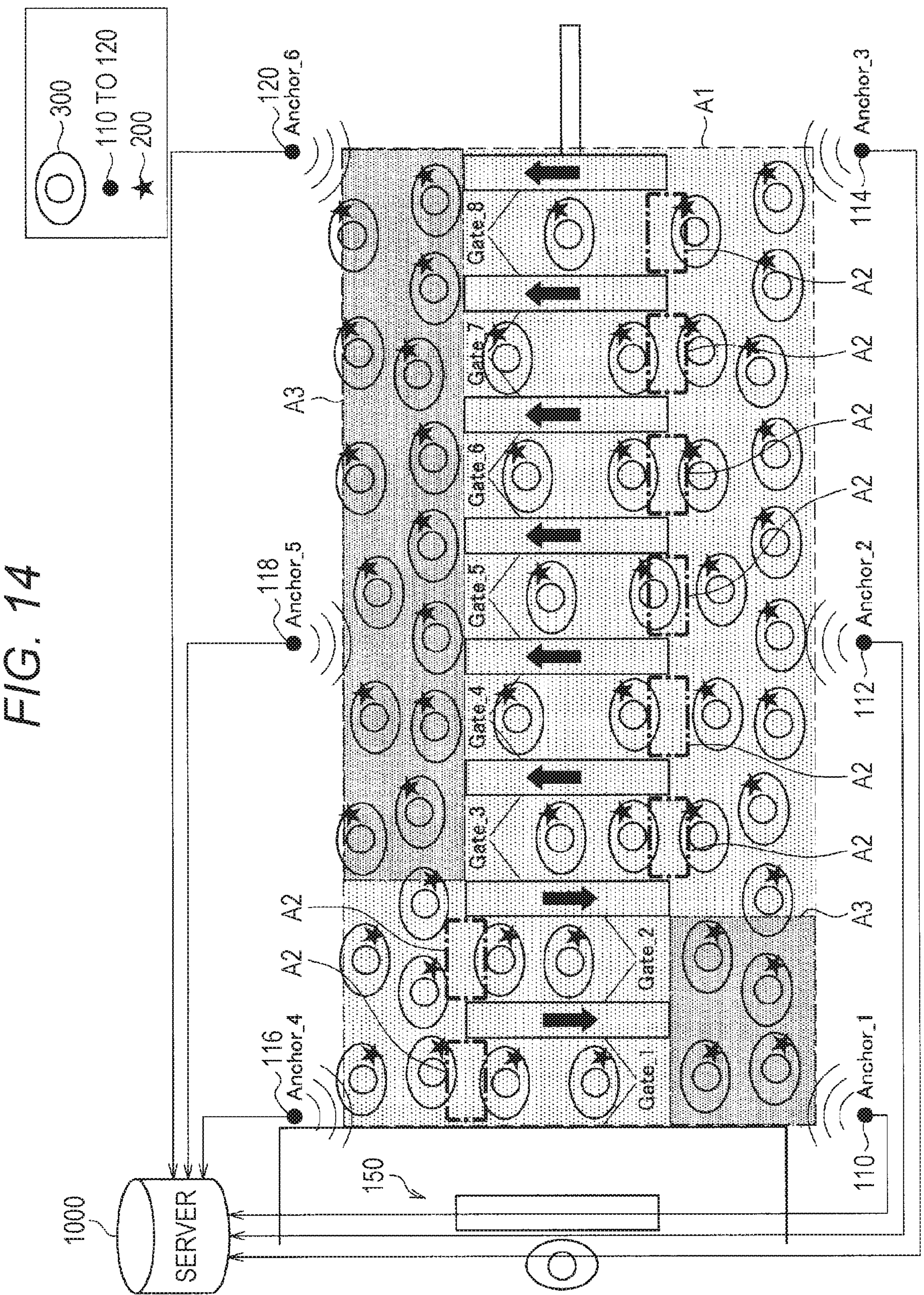
FIG. 14 is a schematic diagram illustrating an example in which a tag that has been subject to authentication and has passed through a ticket examination area is made unresponsive to a command for a certain period of time.

As another countermeasure against packet collision, it is conceivable to reduce the possibility of packet collision by making the tag 200 that has been subject to authentication and has passed through the ticket examination area unresponsive to a command for a certain period of time as illustrated in FIG. 14. In the example illustrated in FIG. 14, the possibility of packet collision is reduced by making tags in a region A3 surrounded by a two-dot dashed line unresponsive to a command for a certain period of time since the tags have already passed through the ticket examination area.

3.2.2. Combination of Low-Precision Positioning and High-Precision Positioning

From the above-described viewpoint, a communication protocol in a case of combining low-precision positioning (coarse positioning) and high-precision positioning (fine positioning) will be described. The communication protocol can further reduce packet collision. In this method, the possibility of packet collision is reduced by determining an approximate position of each tag 200 by the low-precision positioning and performing the above-described high-precision positioning only for the tag 200 near the authentication intention detection position.

Figure 15:
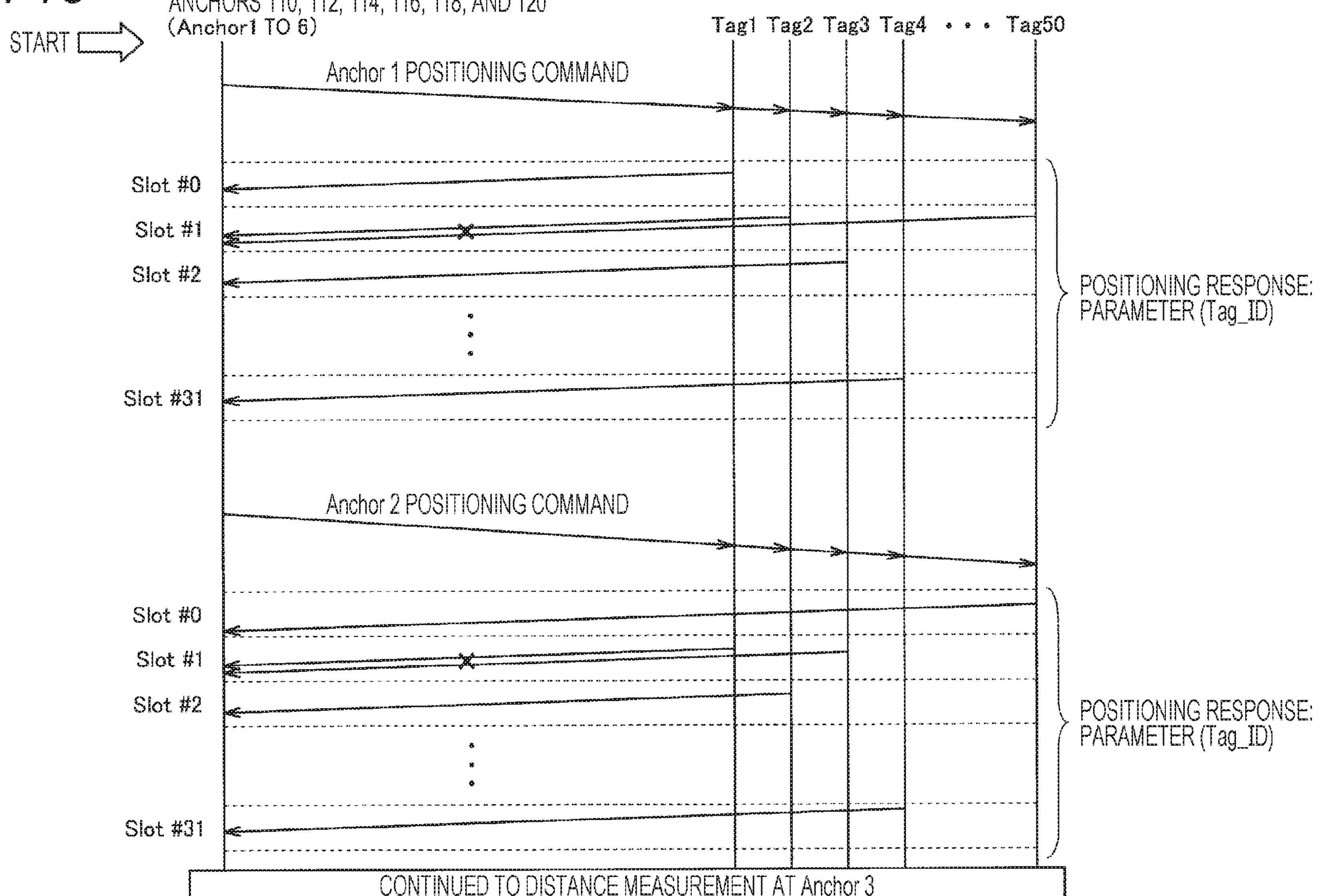
FIG. 15 is a schematic diagram illustrating a sequence for low-precision positioning.

FIG. 15 is a schematic diagram illustrating a sequence for low-precision positioning. Here, first, the low-precision positioning illustrated in FIG. 15 is performed. Specifically, a distance measurement command is transmitted from the anchor 110, and 32 slots receive responses of the tags 200. That is, the number of slots for the responses to the distance measurement command is set to 32. Although this communication is performed 24 times in FIGS. 12 and 13, the communication is performed only once here. Furthermore, the response includes an ID (tag ID) of each tag that has transmitted the response. Next, the anchors 112, 114, 116, 118, and 120 perform similar communication, and distance measurement and positioning are performed. Although, at this time, high-precision positioning cannot be performed since only a few distance measurements have been performed for each tag 200, an approximate position of the tag 200 can be grasped.

Next, the above-described high-precision positioning is performed only for the tag 200 near the authentication intention detection position (region A2 illustrated in FIG. 11) on the basis of information regarding the approximate position obtained from the above-described low-precision positioning. The position of each tag 200 and a tag ID are associated and acquired on the side of the anchor 110 by receiving a response from the tag 200 in advance. Consequently, a command for high-precision positioning can be transmitted only to the tag 200 near the authentication intention detection position.

Figure 16:
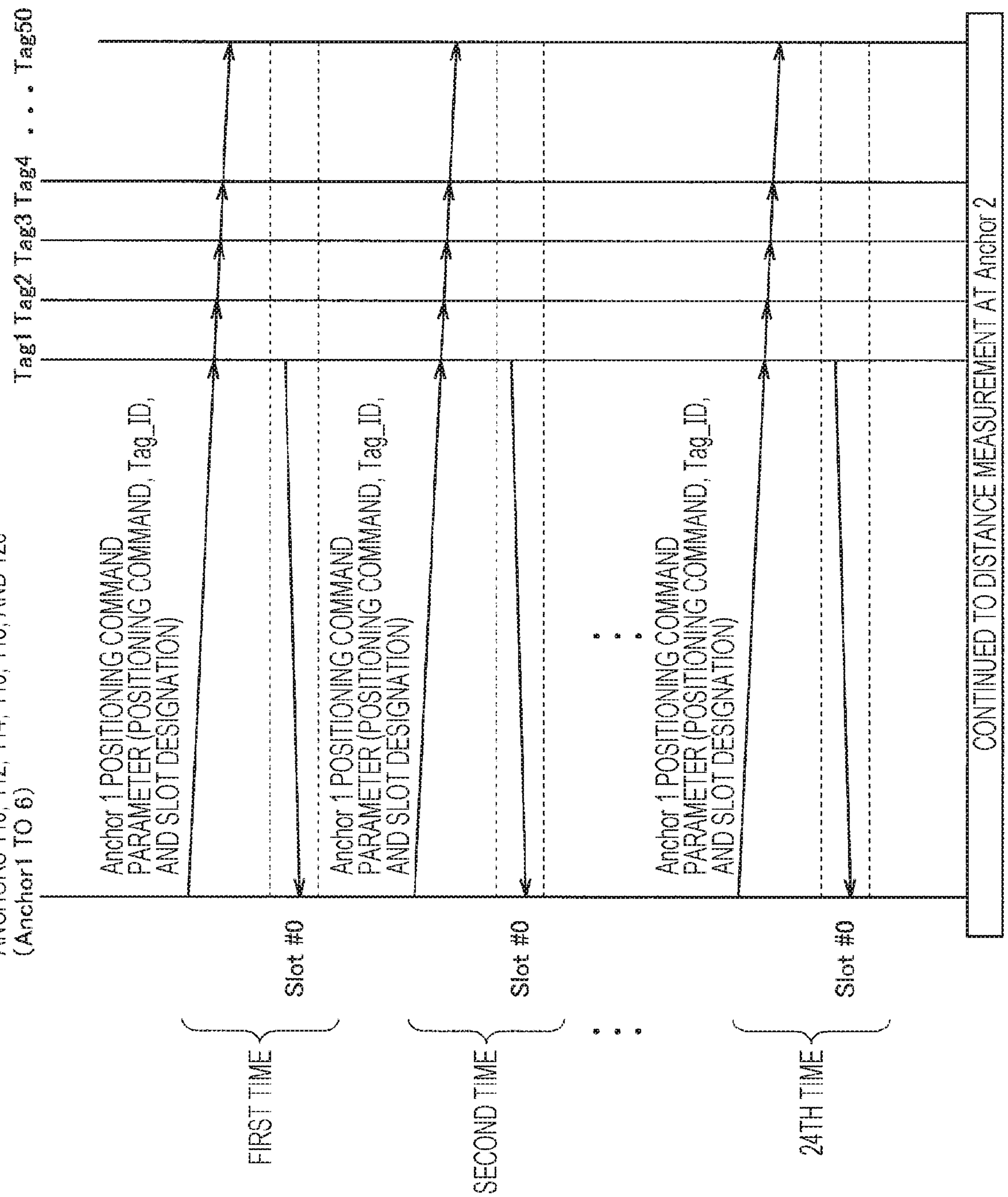
FIG. 16 is a schematic diagram illustrating how sequential 24 times of distance measurements are performed for a specific tag near an authentication intention detection position after an anchor has designated a tag ID.

Specifically, as illustrated in FIG. 16, sequential 24 times of distance measurements are performed for a specific tag 200 near the authentication intention detection position after the anchor 110 has designated a tag ID. Note that the slot at this time is fixed to 0, and high-precision positioning in which the above-described influence of a frequency error between crystal oscillators is minimized is performed. For this reason, the anchor 110 transmits information for designating a tag ID and a slot (slot 0) together with a distance measurement command. This distance measurement is similarly performed for the anchors 112, 114, 116, 118, and 120, and whether or not the specific tag 200 is in the authentication intention detection position is confirmed. Then, this sequence of high-precision positioning is applied also to other tags 200 near the authentication intention detection position. Thereafter, authentication communication is performed for the tag 200 whose presence in the authentication intention detection position has been confirmed The advantage of this method is that communication can be performed more efficiently than in a case where only the high-precision positioning is performed since the approximate position of the tag 200 is first grasped and the high-precision positioning is performed only for a tag near the authentication intention detection position. Note that a distance measurement error may be caused by the above-described frequency error between crystal oscillators in the low-precision positioning since a slot system is used. The low-precision positioning can be thought of as it is. Furthermore, designating a slot as 0 in high-precision positioning enables further high-precision positioning than that in a case where only the above-described high-precision positioning is performed. Note that, similarly to the case where only the high-precision positioning is performed, there is a slight possibility that collision of response packets causes some tags 200 to be undetectable.

3.2.3. Protocol in Case where Tag ID is Collected in Advance

Figure 17:
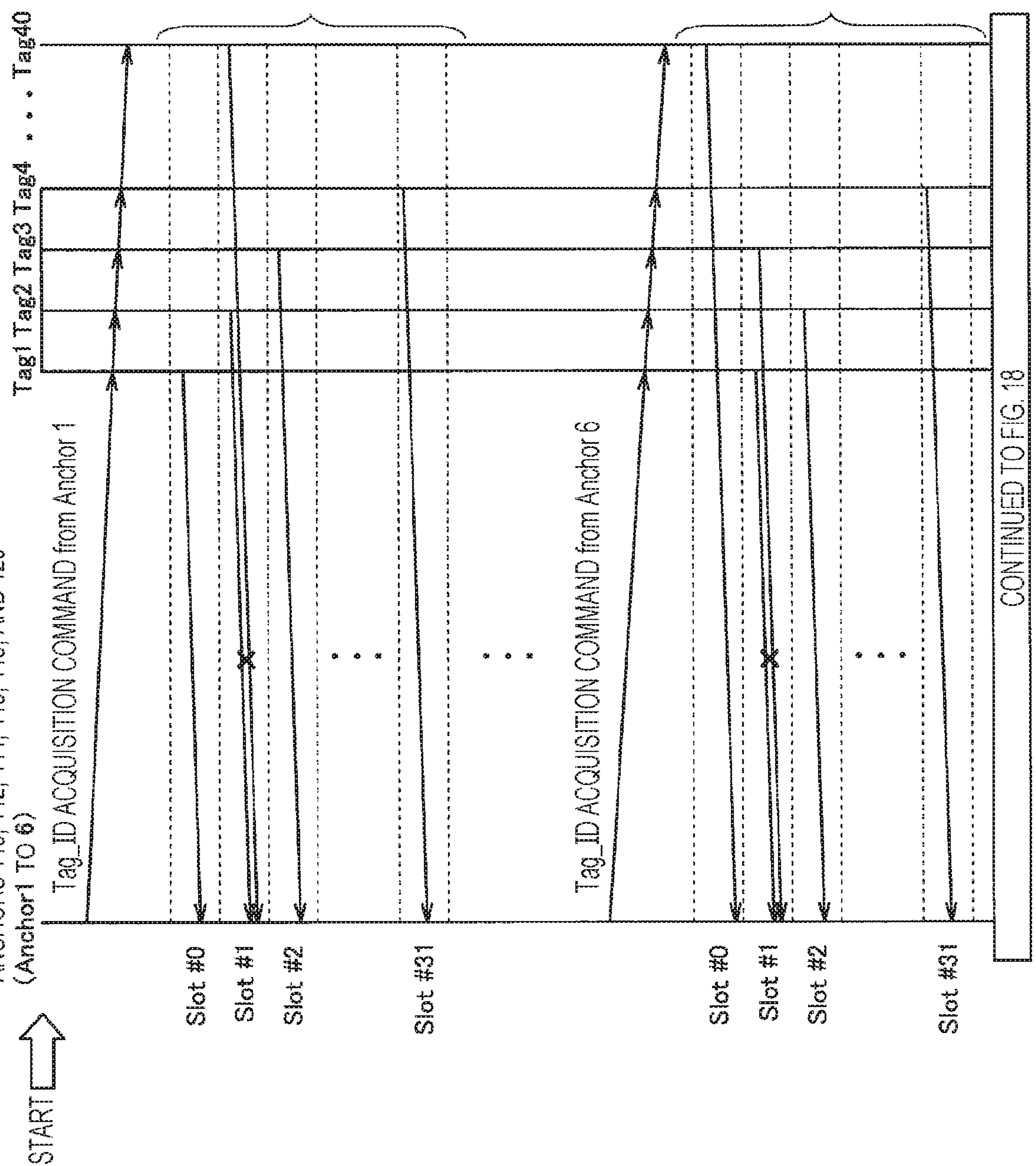
FIG. 17 is a schematic diagram illustrating a sequence along which a tag ID acquisition command is transmitted from an anchor to each tag and a tag ID is acquired from each tag.

Next, a communication protocol will be described. Along the communication protocol, IDs of tags that are in the communication range (region A1 illustrated in FIG. 11) and have not passed through the ticket examination area are collected, and low-precision positioning and high-precision positioning are sequentially performed. This approach can reduce the probability of collision of response packets. As illustrated in FIG. 17, first, the anchor 110 transmits a tag ID acquisition command to each tag 200. Thereafter, the anchor 110 waits for responses at each time slot timing. Note that the number of slots is set to 32 here. Each tag 200 that has received the tag ID acquisition command determines the timing of a slot to which return is to be performed, and transmits a response together with the tag ID of the tag 200. Therefore, the anchor 110 can collect the IDs of the tags 200 in the communication range.

Thereafter, the anchors 112, 114, 116, 118, and 120 sequentially perform the same operation. At this time, a specification may be adopted. In the specification, the tag ID that has been acquired by the anchor 110 is added to the tag ID acquisition command as a parameter. In a case where a command parameter includes the tag ID of the tag 200, each tag 200 that has received the tag ID acquisition command does not return a response. This specification further reduces the probability of collision of response packets. Furthermore, in a case where the anchor 110 has a sufficiently wide communication range and can acquire a necessary tag ID, the anchors 112, 114, 116, 118, and 120 do not need to transmit the tag ID acquisition command, and the low-precision positioning of the next step may be performed. That is, the purpose of the above-described operation is to acquire as many tag IDs in the communication range as possible.

Figure 18:
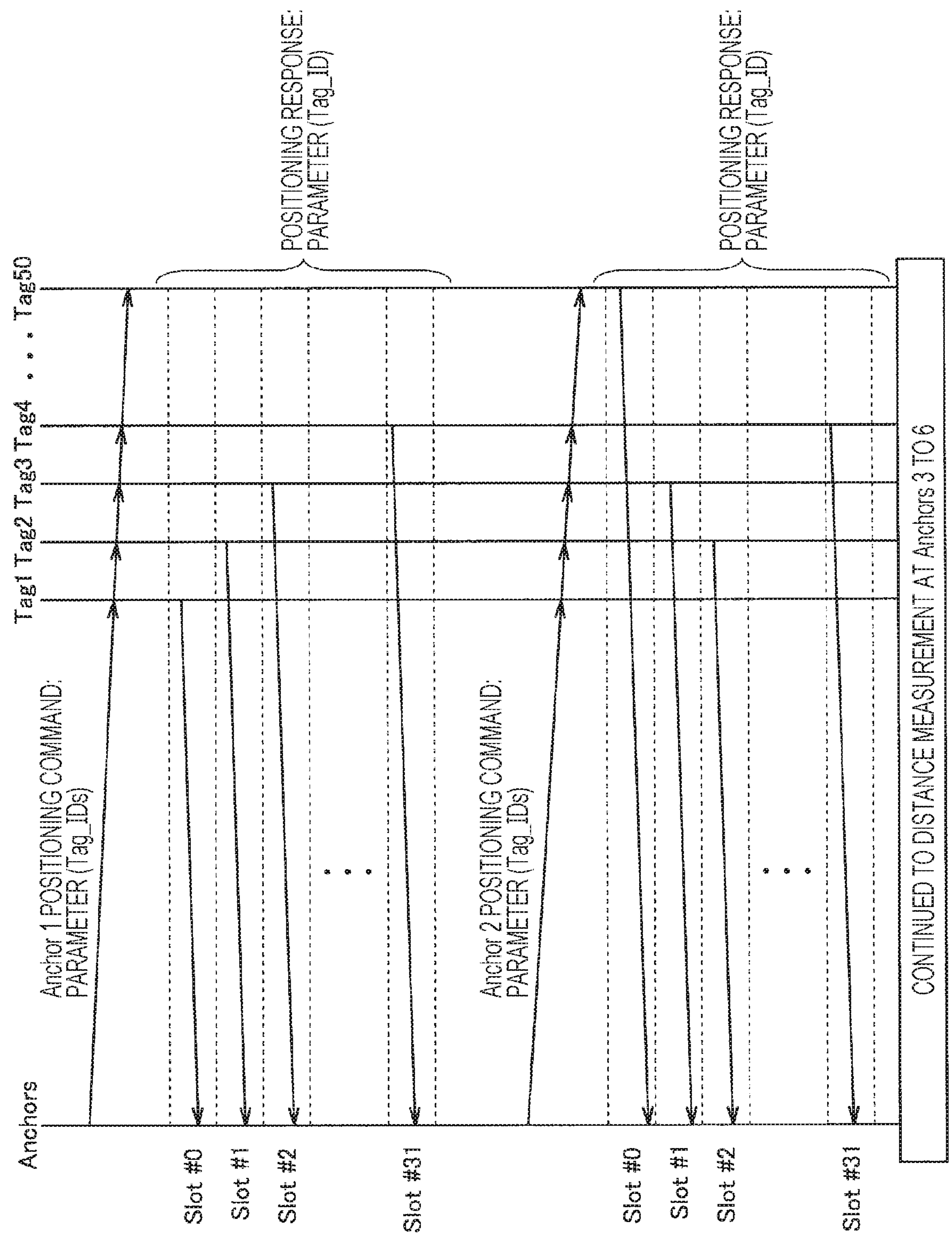
FIG. 18 is a schematic diagram illustrating a sequence along which low-precision positioning is performed after a tag ID has been acquired from each tag.

Next, the low-precision positioning is performed as illustrated in FIG. 18. The low-precision positioning performed here is different from the low-precision positioning described in FIG. 15 in the following points.

(1) The anchor adds tag IDs that have been acquired by the number of slots and the response timing of each tag as a parameter to be added to the positioning command.

(2) In a case where the tag ID in the received positioning command matches the ID of a tag, the tag transmits a response at the timing designated by the positioning command.

(3) State transition of a tag is performed so that the tag is unresponsive to a tag ID acquisition command for a certain period of time after transmission of a response.

(4) Each time a positioning command is transmitted, each anchor designates response timing different from that has been transmitted last time (randomizes response timing) even in a case where the tag IDs are the same.

As described above, collision of response packets can be prevented by designating a tag to be subject to distance measurement and designating response timing by the above-described (1) and (2). Furthermore, the above-described (3) is a measure for reducing the possibility that a tag cannot be detected due to the collision of response packets. Specifically, in an entire sequence, tag ID acquisition to low-precision positioning to high-precision positioning to authentication communication is repeated. In this case, the tag 200 may be undetectable at the time of acquiring the tag ID due to the collision of response packets. Here, if no response is returned to a tag ID acquisition command after a response to a distance measurement command is returned, the probability of collision of response packets at the time of sequentially performed acquisition of tag IDs can be reduced. The probability of presence of an undetectable tag 200 can be reduced. Furthermore, the above-described (4) can minimize a distance measurement error due to a frequency error between crystal oscillators of an anchor and a tag.

After performing low-precision positioning, the high-precision positioning illustrated in FIGS. 12 and 13 is performed only for the tag 200 near the authentication intention detection position, and whether or not the tag 200 is in the authentication intention detection position is confirmed. Thereafter, authentication communication is performed for the tag whose presence in the authentication intention detection position has been confirmed.

The advantage of this method is that the possibility of presence of a tag that cannot be detected due to collision of response packets described in protocol in a case where only high-precision positioning is used and combination of low-precision positioning and high-precision positioning can be reliably reduced. Note, however, that if the tag 200 is set unresponsive to a tag ID acquisition command by performing the above-described state transition, a case of a person who exits the ticket examination area and immediately enters the ticket examination area again cannot be handled. This case is handled by continually adding the acquired tag ID to a command of low-precision positioning as a parameter for a certain period of time. This enables positioning even if a tag ID that has been subject to state transition cannot be acquired. Presence of a tag in the authentication intention detection position can be confirmed.

3.2.4. Authentication Communication

Authentication communication is performed only for the tag 200 whose presence in the authentication intention detection position has been detected. That is, a corresponding tag ID is added to a command for authentication communication. Here, in the authentication communication, it is unnecessary for a plurality of anchors to obtain information as in the positioning. Only one anchor is required to communicate with the tag 200 and confirm whether or not the tag 200 has the right to pass through a gate. In that case, it is necessary to select which of the plurality of anchors 110, 112, 114, 116, 118, and 120 should communicate with the tag 200. The approach will be described below.

First, an approach of selecting an anchor closest to the tag 200 is cited since the position of the tag 200 to be authenticated has been known. This is because a shorter distance basically leads to stronger resistance against noise in communication. In contrast, a short distance does not necessarily mean strong noise resistance depending on an environment.

Here, it is assumed that information that has been obtained by communication for positioning is used. In positioning, basically all the anchors 110, 112, 114, 116, 118, and 120 receive a response from each tag 200. At that time, information (e.g., SN ratio, the number of error corrections, and communication performance success rate in a case of continuous communication) that has been obtained at the time of demodulation at the anchors 110, 112, 114, 116, 118, and 120 is retained. An anchor having the best characteristics is selected, and is made to perform authentication for the desired tag 200. Moreover, in a case where the selected anchor cannot demodulate a response the specific number of times, the anchor to perform authentication may be changed to an anchor having the second-best communication characteristics among the anchors obtained from the above-described information. Furthermore, another method is also conceivable. In the method, the tag 200 also transmits information that has been obtained at the time of demodulating the tag 200 at the time when the tag 200 returns a response to the anchors 110, 112, 114, 116, 118, and 120. An anchor having the best demodulation characteristics for a tag is select. These approaches enable authentication communication with the most stable communication performance. Moreover, it is unnecessary for only, in particular, the anchor that has transmitted a command to perform modulation in response reception. Each anchor 200 individually performs demodulation, and a packet in which no error is detected is adopted as a response, whereby communication performance can be further stabilized. Furthermore, as another effect of this method, RF output at the time of returning a response from the tag 200 can be weakened, and reduction of power consumption can be expected. Note that a later-described selection unit 1700 of a server 1000 selects the optimum anchor 100 as described above.

3.2.5. Method for Improving Communication Performance

Here, a method of improving communication performance by using a protocol in a case of collecting tag IDs in advance will be described. Similarly to the case of the above-described authentication communication, it is unnecessary for only the anchor that has transmitted a command to demodulate a response in acquiring a tag ID as well. That is, communication efficiency can be improved by increasing the probability of tag ID acquisition by an anchor that has not transmitted a command performing demodulation.

Methods of improving communication performance in low-precision positioning include retaining the optimum demodulation setting (e.g., filter coefficient) obtained by processing a demodulation signal at the time of demodulating the last tag ID acquisition command and at the time of demodulating a response in both of the tag 200 and the anchors 110, 112, 114, 116, 118, and 120, switching setting to the optimum demodulation setting in a case of performing low-precision positioning, and performing communication in a state optimal for reception. Here, the tag 200 knows in what order the anchors 110, 112, 114, 116, 118, and 120 transmit a command, that is, know, in advance, which anchor has transmitted the command. These can be determined in advance as a specification. Furthermore, as illustrated in FIG. 18, the anchors 110, 112, 114, 116, 118, and 120 designate response timing for each tag 200 in distance measurement commands of low-precision positioning, so that the anchors 110, 112, 114, 116, 118, and 120 know, in advance, which tag 200 transmits a response. Therefore, a corresponding optimum demodulation condition can be set before response reception for each of the anchors 110, 112, 114, 116, 118, and 120 and the tag 200.

Similarly to the case of low-precision positioning, an optimum demodulation condition obtained from communication of low-precision positioning is desirably set in advance in high-precision positioning. Furthermore, as illustrated in FIG. 16, communication is performed multiple times in high-precision positioning. Sequentially optimizing a demodulation state each time each command and a response are received enables continual communication under an optimum condition. Similarly to in the high-precision positioning, setting, in advance, the optimum demodulation condition obtained from communication of high-precision positioning or sequentially optimizing a demodulation state each time a command and response for authentication are received can be applied to authentication communication. In addition, as a measure in view of protocols, the number of commands and responses at the time of authentication can be reduced by adding a function (e.g., balance confirmation) of simultaneously reading information other than that regarding distance measurement to a command of high-precision positioning, whereby communication efficiency can be enhanced. Note that a later-described reception processing unit 1200 of the server 1000 optimizes condition at the time of demodulation as described above.

3.2.6. Handling for Counter Next to Ticket Examination Area

As illustrated in FIG. 11, a counter 150 is provided next to the ticket examination area. The counter 150 next to the ticket examination area does not need to have a system synchronized with the ticket examination area. The counter 150 is required to work only in a case of receiving an inquiry from a person using the ticket examination area. For this reason, handling different from that for a gate of the ticket examination area needs to be considered for the counter 150. Constructing a separate positioning system only for the counter 150, however, involves a cost. For this reason, the counter 150 performs an interface such as NFC that starts authentication communication by using the fact that the tag 200 enters a specific distance as a trigger. In this case, the number of anchors installed at the counter 150 can be reduced to one, and the cost can be reduced. Furthermore, the similar thing can be applied to a charging machine placed at the counter 150.

3.3. Communication Protocol in Case of Performing Control for Each Gate

Figure 19:
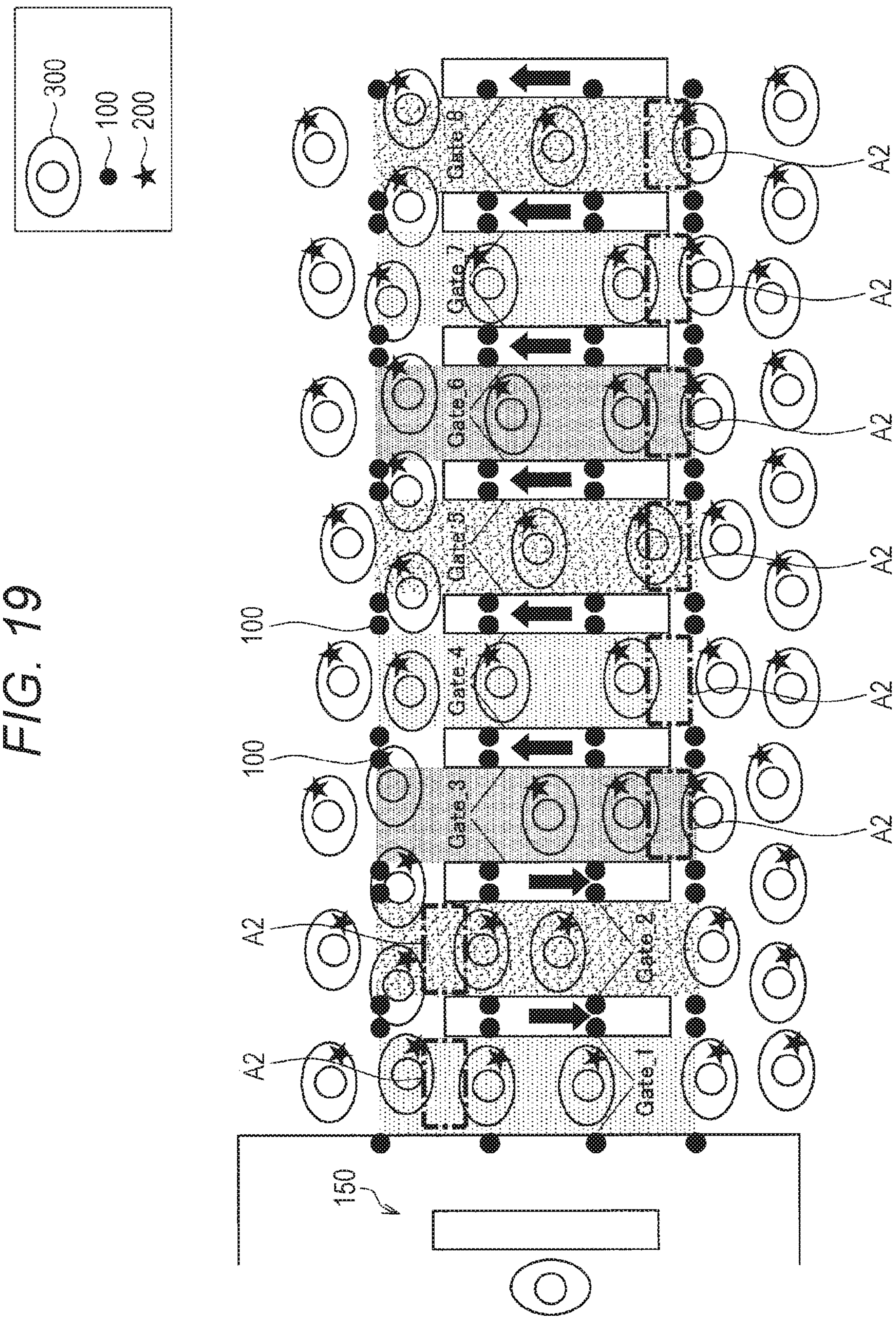
FIG. 19 is a schematic diagram for illustrating a communication system and a protocol in a case of performing control for each gate.

Next, a case of performing control for each gate will be described. FIG. 19 is a schematic diagram illustrating a communication system and a protocol in a case of performing control for each gate. The communication system and the protocol in the case of performing control for each gate will be described below.

3.3.1. Protocol

In FIG. 19, the communication distance of each anchor 100 may be shorter than that assumed in the above-described communication protocol in a case of controlling the positioning for an entire ticket examination area. That is, one anchor 100 does not detect more tags than in a case of controlling the positioning for an entire ticket examination area. In that case, low-precision positioning does not necessarily need to be performed. The description will be made below assuming that a sequence of tag ID acquisition to high-precision positioning to authentication communication is repeated.

Figure 20:
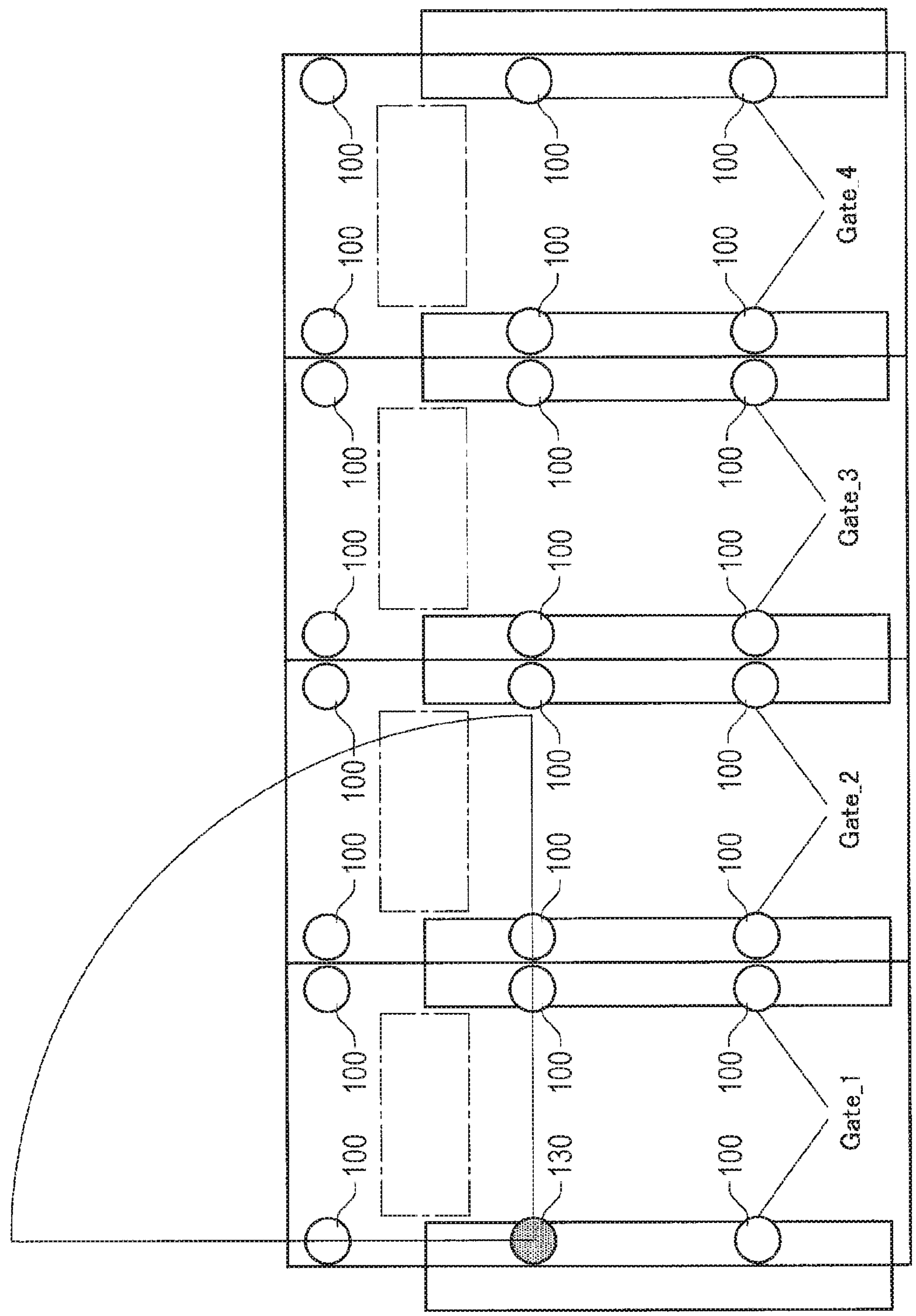
FIG. 20 is a schematic diagram for illustrating the communication system and the protocol in a case of performing control for each gate.
Figure 21:
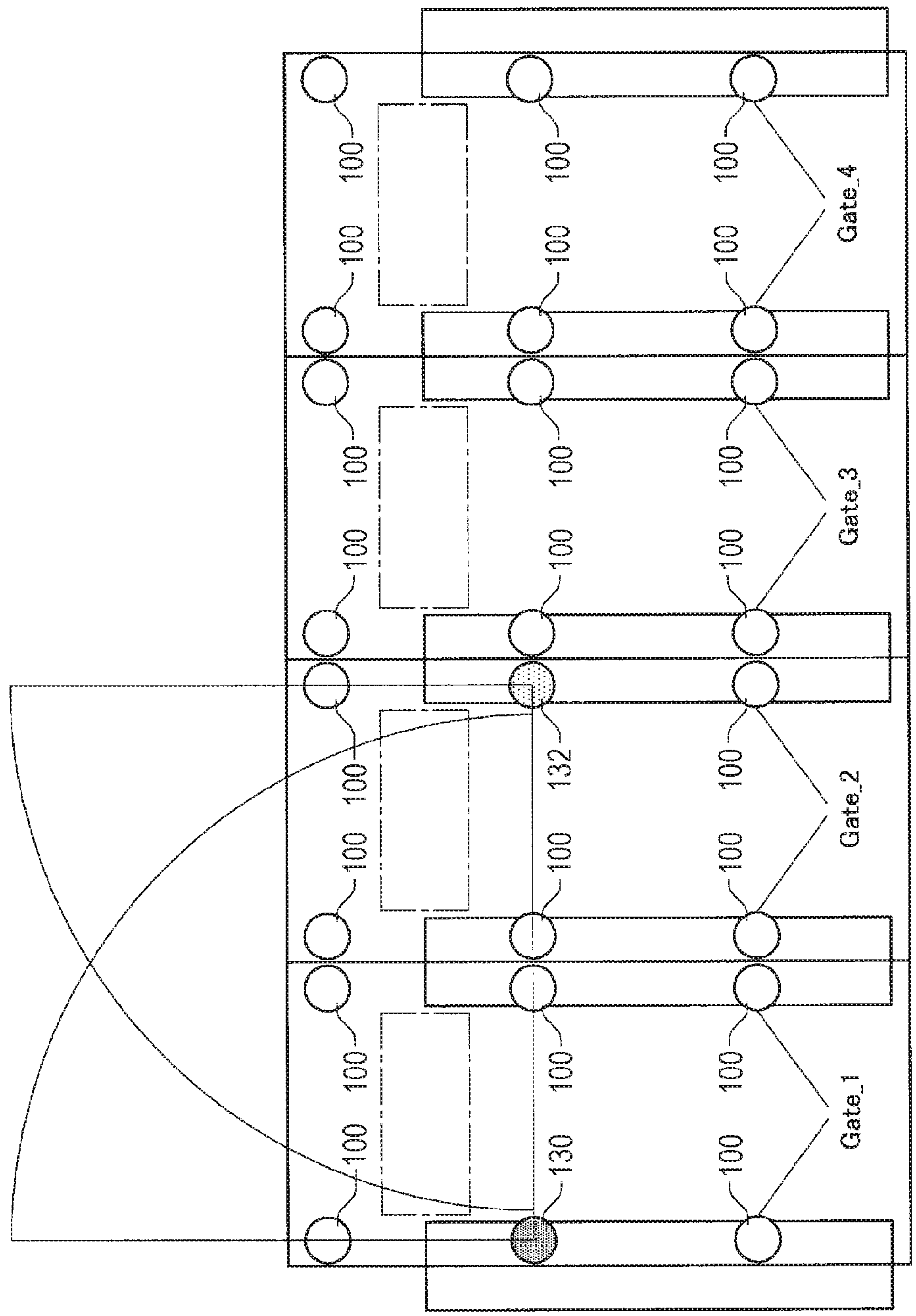
FIG. 21 is a schematic diagram for illustrating the communication system and the protocol in a case of performing control for each gate.

As illustrated in FIG. 20, the communication distance from the anchor 100 is set not only to handle only one gate but to enable longer-distance communication in consideration of variations due to, for example, environments. FIG. 20 illustrates that an anchor 130 has a communication distance that enables communication to the next gate. A similar fact is applied to communication distances of other anchors 100. Each gate autonomously controls communication, and does not synchronize with another gate. In this case, as illustrated in FIG. 21, RF packets may collide at anchors provided at adjacent gates. FIG. 21 illustrates RF packets colliding at two anchors 130 and 132 provided at adjacent gates.

Figure 22:
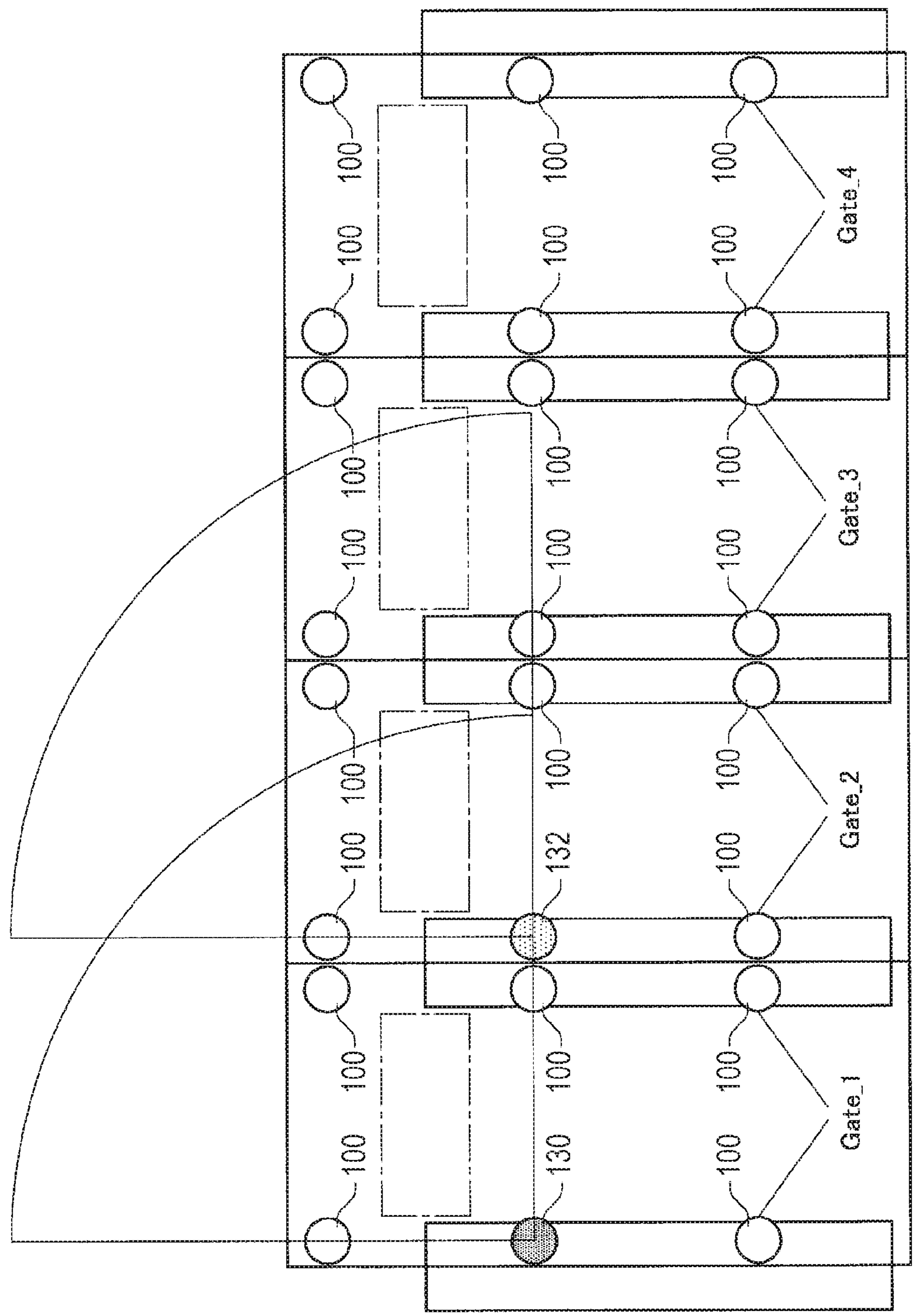
FIG. 22 is a schematic diagram for illustrating the communication system and the protocol in a case of performing control for each gate.

Even in a case of assuming that timing of an anchor that transmits a command between gates is synchronized, RF packets may collide at anchors provided at adjacent gates as illustrated in FIG. 22. FIG. 22 illustrates RF packets colliding at the two anchors 130 and 132 provided at adjacent gates.

Figure 23:
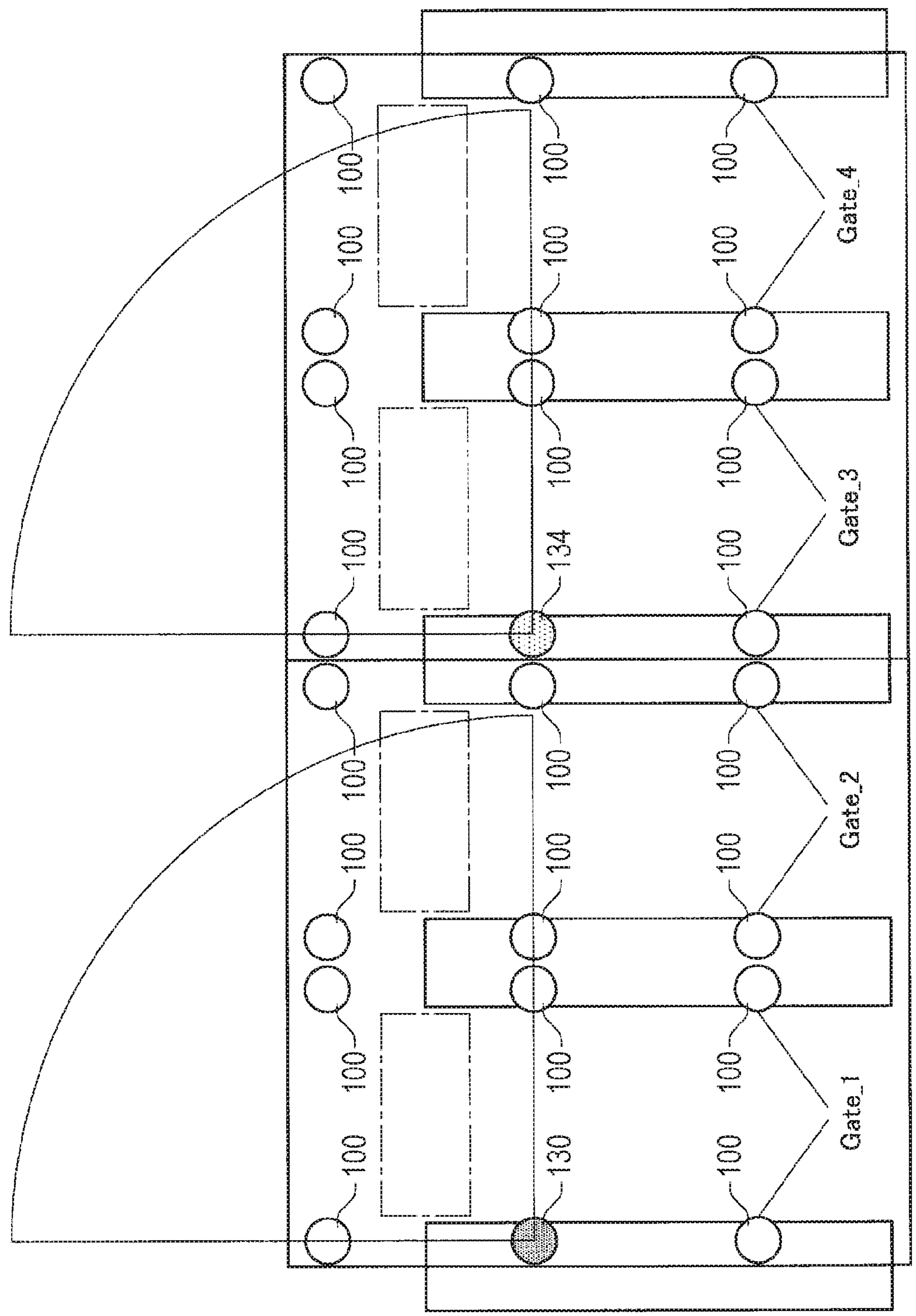
FIG. 23 is a schematic diagram for illustrating the communication system and the protocol in a case of performing control for each gate.

Therefore, as illustrated in FIG. 23, the timing when anchors transmit a command needs to be synchronized every two gates. In the example of FIG. 23, a gate 1 and a gate 2 are synchronized, and a gate 3 and a gate 4 are synchronized. This prevents collision of RF packets at the anchor 130 of the gate 1 and an anchor 134 of the gate 3 illustrated in FIG. 23.

Figure 24:
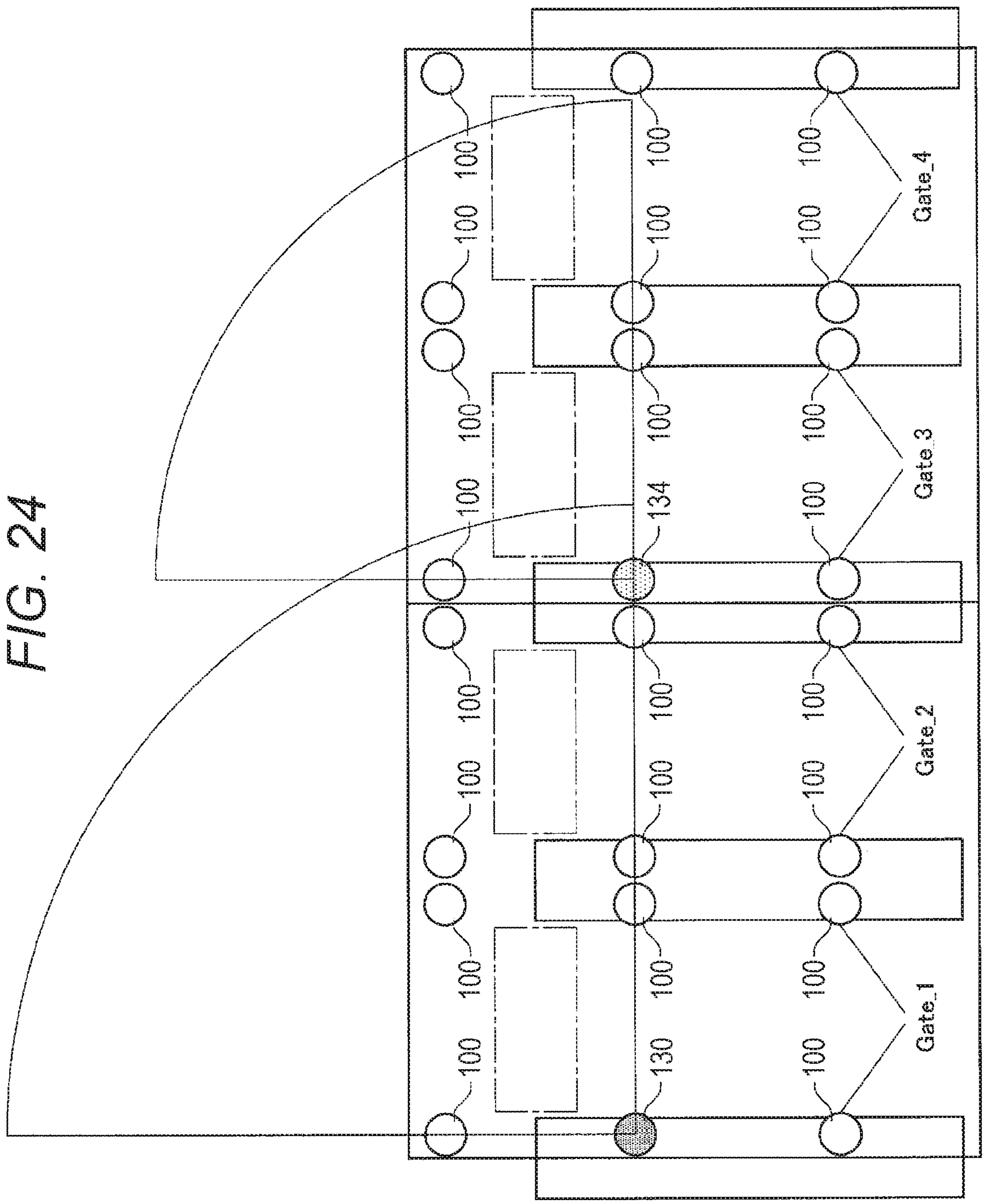
FIG. 24 is a schematic diagram for illustrating the communication system and the protocol in a case of performing control for each gate.

A communication distance, however, greatly depends on environments. If the communication distance changes as illustrated in FIG. 24, the collision is highly assumed to occur even in the case of FIG. 23. In the example of FIG. 24, a command from the anchor 130 of the gate 1 collides against a command from the anchor 134 of the gate 3. Furthermore, the collision of RF packets raises a similar problem also at the time when a plurality of tags 200 returns a response.

Figure 25:
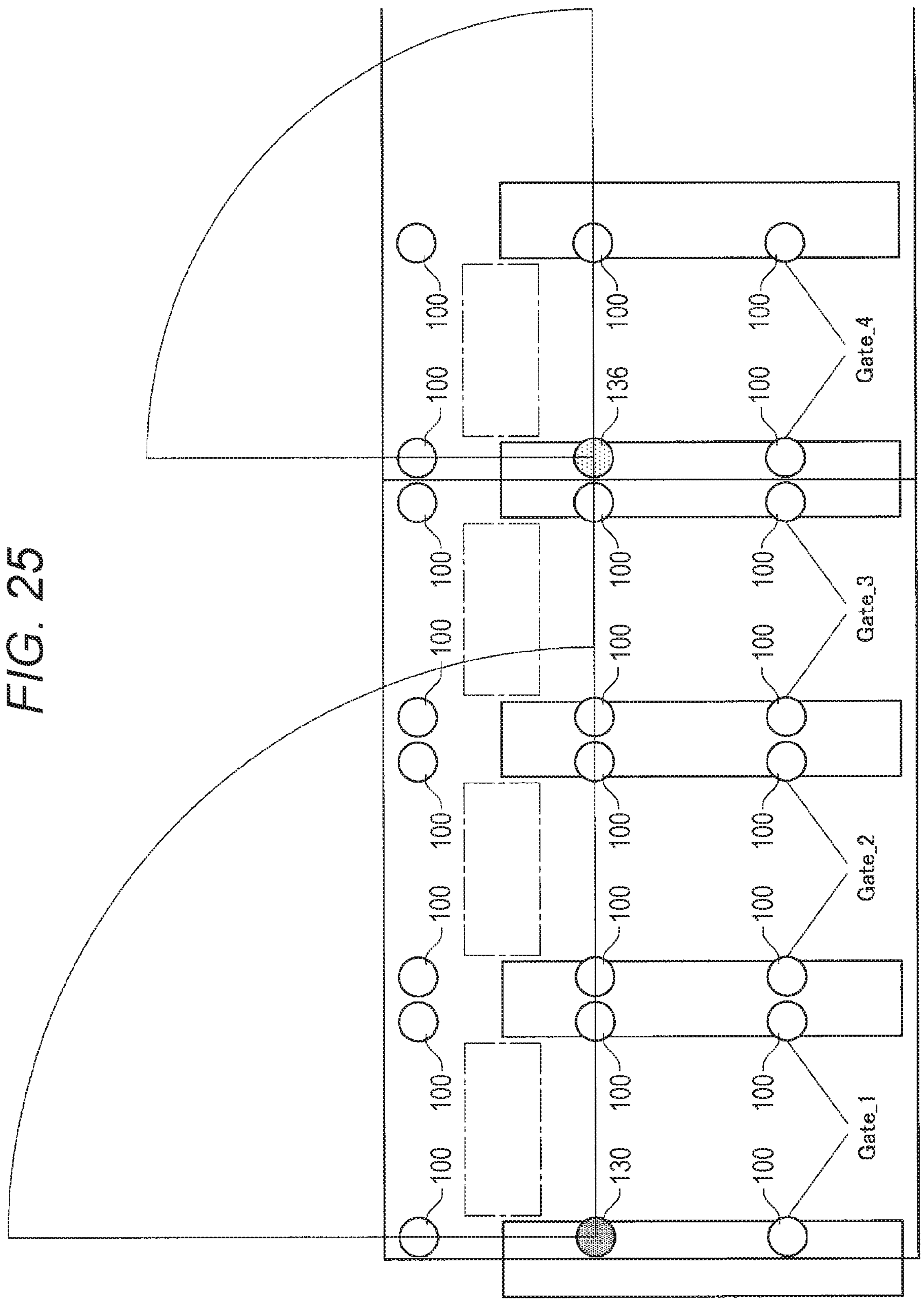
FIG. 25 is a schematic diagram for illustrating the communication system and the protocol in a case of performing control for each gate.

In order to avoid the above-described situation, as illustrated in FIG. 25, three or more gates are provided. Control in which synchronization is performed every three gates is performed. A sufficient distance is left between anchors to be synchronized. It is thereby conceivable to prevent packet collision. As illustrated in FIG. 25, RF packets of the anchor 130 of the gate 1 and an anchor 136 of the gate 4 do not collide. Note that, since command transmission timing of anchors at three gates is sequentially shifted to prevent RF packet collision, time taken for high-precision positioning may be relatively longer.

3.3.2. Resistance Against RF Packet Collision

Here, resistance against RF packet collision will be described. In common wireless communication, a spread code system is mounted to improve noise resistance. Here, the spread code system will be outlined with reference to FIGS. 26 and 27. As illustrated in the left diagram of FIG. 26, a transmission side spreads pieces of data "0" and "1" by performing EXOR processing with spread codes [1 0 0 1 0 1 1], and transfers a signal after spreading. A demodulation side can demodulate the transmission data by performing the EXOR processing on the reception signal with the same spread codes as that of the transmission side. Here, the demodulation side knows a spread signal of the transmission side in advance.

Figure 26:
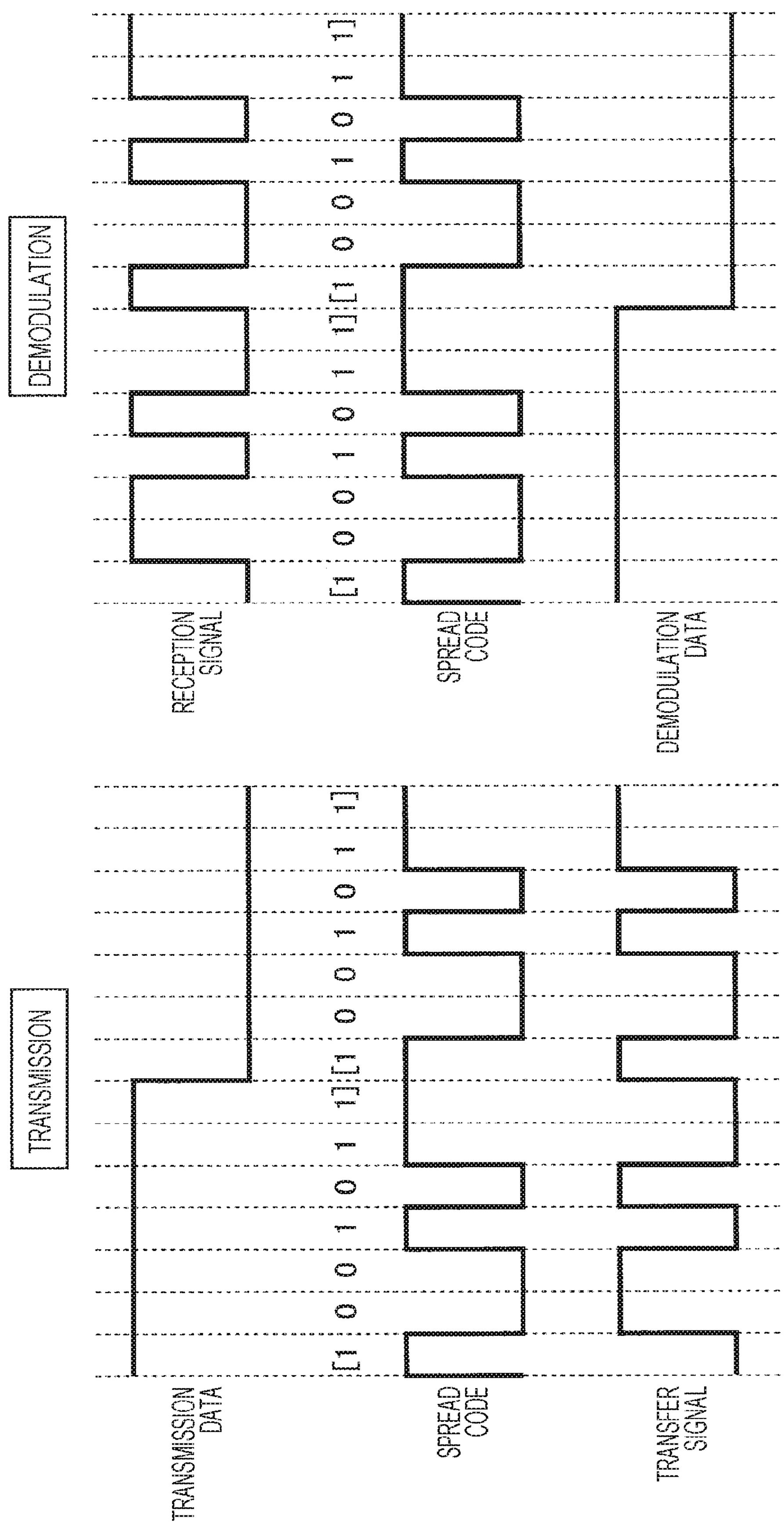
FIG. 26 is a schematic diagram for illustrating a spread code system for improving noise resistance.
Figure 27:
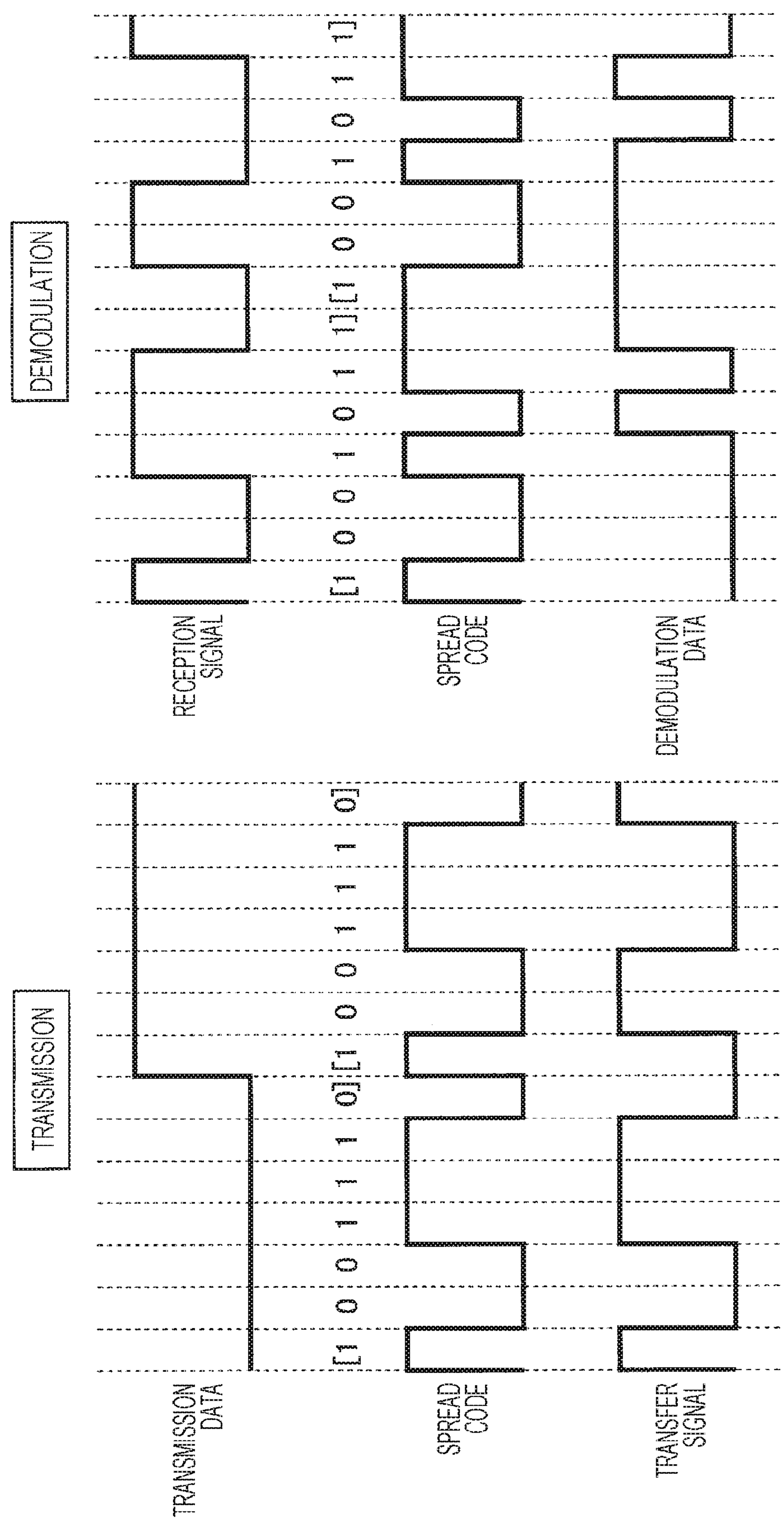
FIG. 27 is a schematic diagram for illustrating the spread code system for improving noise resistance.

Similarly to FIG. 26, FIG. 27 illustrates signals that have been spread on the transmission side and signals that have been demodulated on a reception side. As illustrated in FIG. 27, in a case where the spread signals on the demodulation side are different from those on the transmission side, the transmission data cannot be demodulated, and is simply determined as noise.

Figure 28:
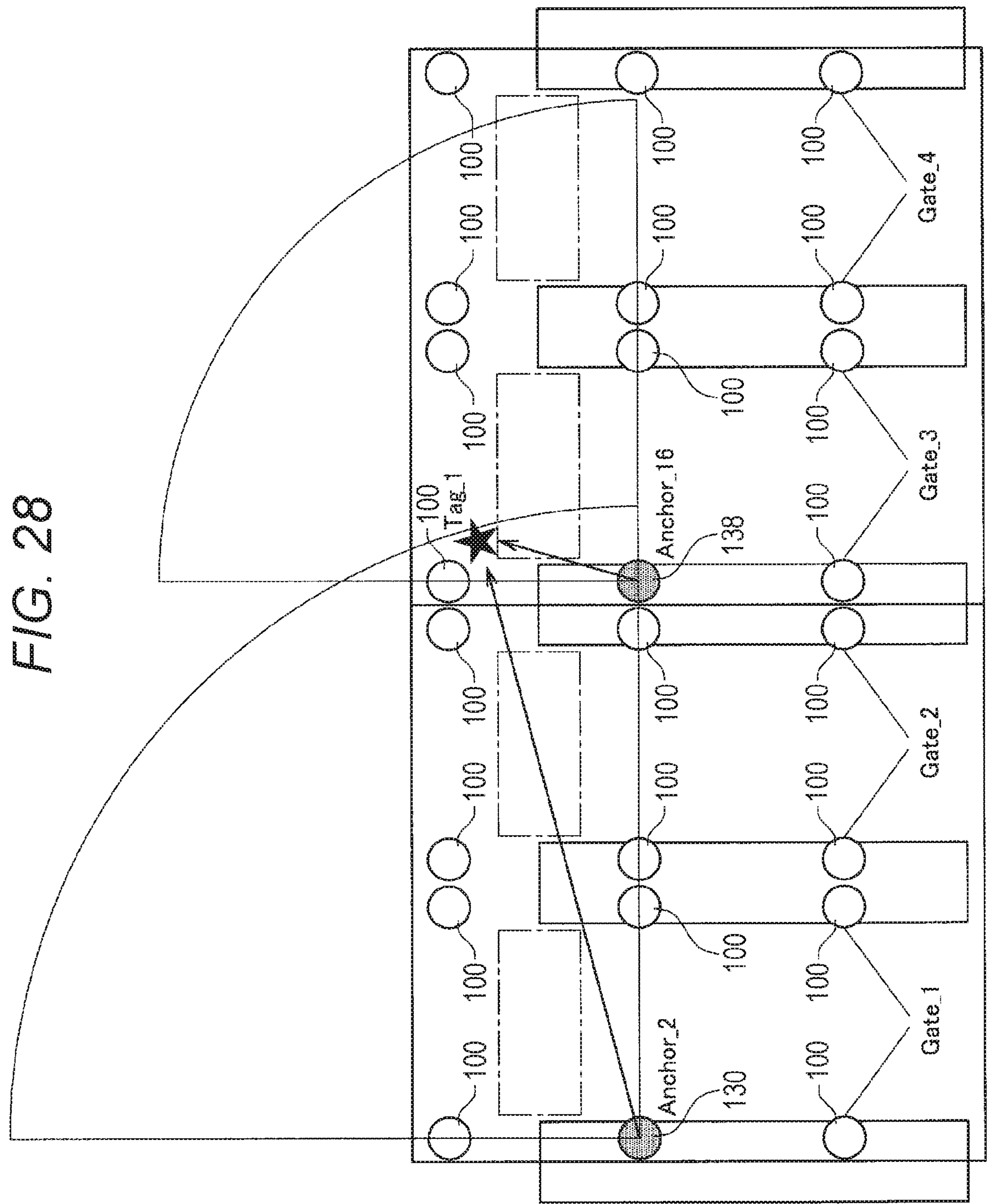
FIG. 28 is a schematic diagram illustrating how commands of anchors have collided in a case of performing control for each gate.

Here, the situation illustrated in FIG. 28 is assumed. Specifically, commands of the anchor 130 and an anchor 138 are assumed to collide at a tag 300. Furthermore, the tag 300 is assumed to know a spread code of the anchor 138 in advance. In this case, as illustrated in FIGS. 26 and 27, the tag 300 regards the command from the anchor 130 as noise by referring to the spread code, whereas the tag 300 may be able to demodulate the command of the anchor 138. Note, however, that this depends on the level of an RF reception signal from the anchor 138 at the tag 300. Furthermore, a similar fact is applied to the case of collision of a plurality of tag responses at the anchor.

Figure 29:
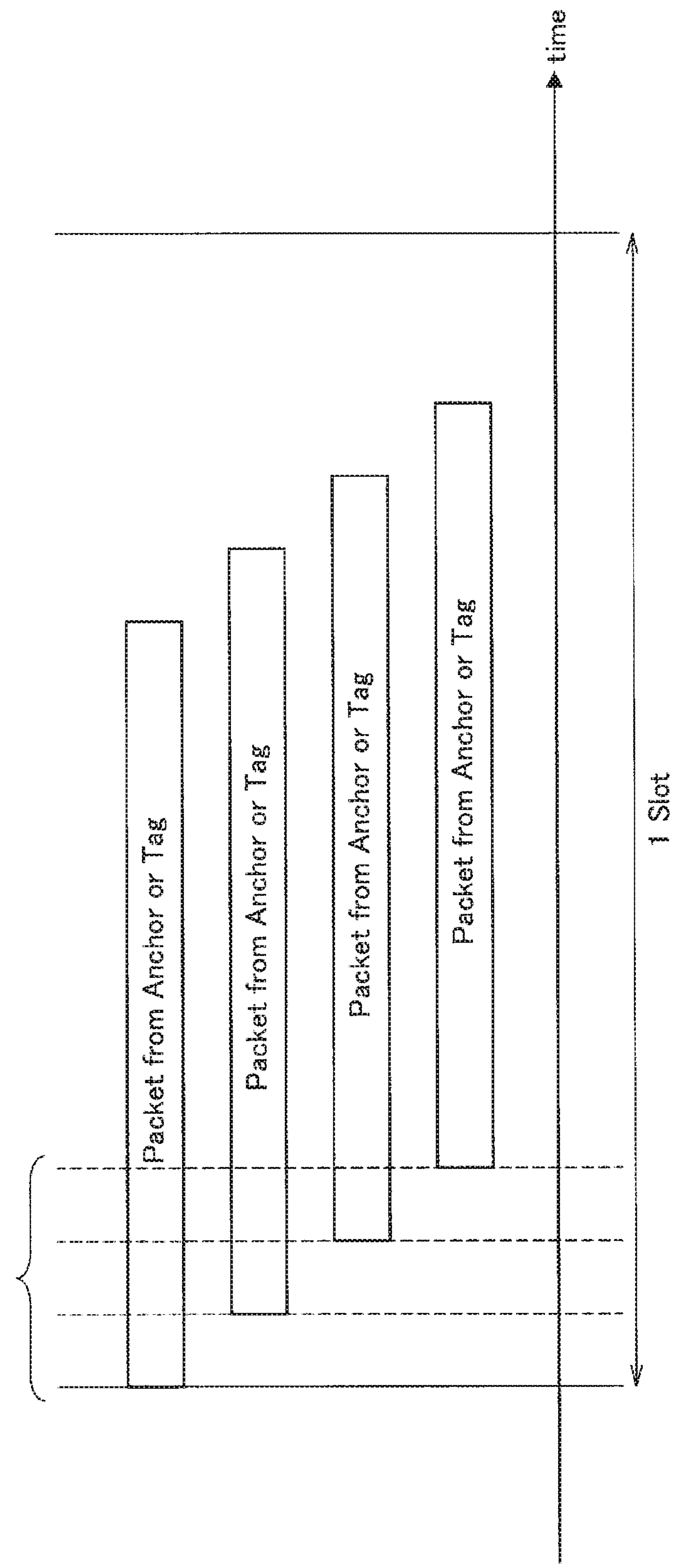
FIG. 29 is a schematic diagram illustrating transmission timing of RF packets randomly shifted in one slot.

Here, IEEE, which stipulates UWB positioning communication, uses a spread code system. In addition, as illustrated in FIG. 29, RF packet collision is handled by intentionally and randomly shifting transmission timing of RF packets in one slot. That is, a method similar to that stipulated by IEEE enables packet demodulation even in a case where RF packets collide to some extent. Note, however, that a disadvantage of decreasing throughput due to spreading may occur. The description will be made below assuming that the RF packet collision is tolerated to some extent.

3.3.3. System in Case of Assuming that Packet Collision is Tolerated

Patterns of packet collision in a case where each gate autonomously performs communication without synchronization will be listed below in a sequence of tag ID acquisition to high-precision positioning to authentication communication. Note that a double-headed arrow indicates collision.

Tag ID Acquisition Response⇔Tag ID Acquisition Response

Tag ID Acquisition Response⇔Tag ID Acquisition Command

Tag ID Acquisition Response⇔High-Precision Positioning Command/Response

Tag ID Acquisition Response⇔Authentication Communication Command/Response

Tag ID Acquisition Command⇔Tag ID Acquisition Command

Tag ID Acquisition Command⇔High-Precision Positioning Command/Response

Tag ID Acquisition Command⇔Authentication Communication Command/Response

High-Precision Positioning Command/Response⇔High-Precision Positioning Command/Response High-Precision Positioning Command/Response⇔Authentication Communication Command/Response Authentication Communication Command/Response⇔Authentication Communication Command/Response The collision of a tag ID acquisition response and a tag ID acquisition response has possibly the highest probability among the patterns. This is because a long-time packet is transmitted to an RF since the tag ID acquisition response is assumed to be continuously transmitted by using a time slot.

Here, the RF packet collision in each sequence will be made clear as follows.

Tag ID acquisition: if a tag ID cannot be acquired due to collision, the subsequent communication cannot be performed at all. Therefore, poor communication here is desirably prevented.

High-precision positioning: perform multiple times of communication with one anchor. Although RF packet collision stochastically occurs at this time, positioning is possible even if communication cannot be performed several times. Note, however, that there is a tradeoff of decreasing precision.

Authentication communication: if communication fails, recovery is possible by, for example, a timeout/retransmission request. Note, however, that there is a tradeoff of increasing communication time.

Therefore, in conclusion, a system is synchronized to prevent packet collision in tag ID acquisition while a spread code is assigned to a tag. Alternatively, a spreading code is assigned to each tag in advance. In high-precision positioning and authentication communication, a method of spreading data with an assigned spread code and allowing each gate to autonomously communicate is considered to be efficient as a system.

Figure 30:
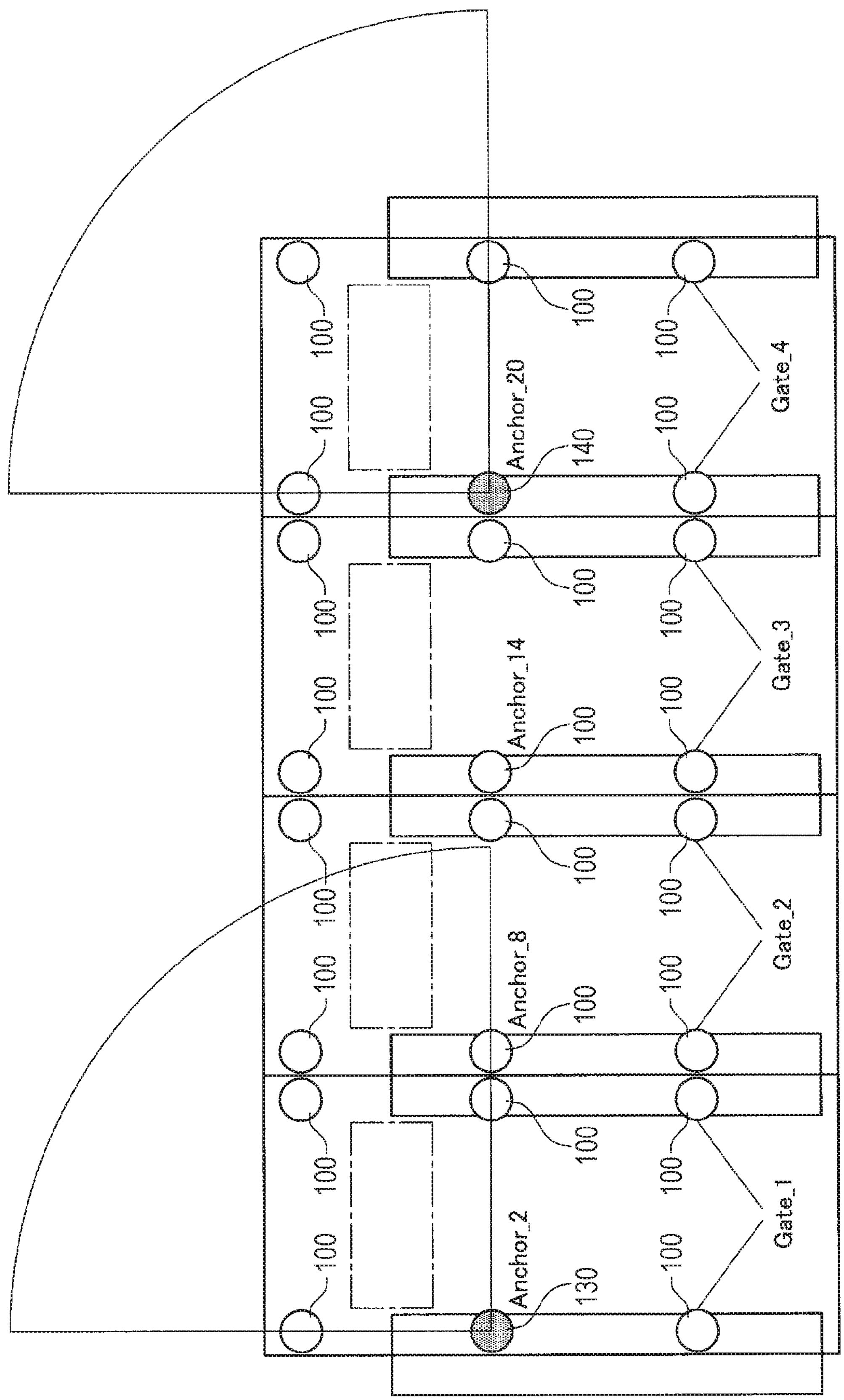
FIG. 30 is a schematic diagram illustrating an example in which the timing of command transmission and response reception is sequentially shifted to prevent RF packet collision in tag ID acquisition.

For example, in FIG. 30, the timing of command transmission and response reception is sequentially shifted to prevent RF packet collision in the order of anchors 2 and 20 to an anchor 8 to an anchor 14 in tag ID acquisition. Since the anchor 2 and the anchor 20 are sufficiently distant from each other and RF packets do not collide, commands can be transmitted at the same timing. Thereafter, a certain period of time is used for high-precision positioning and authentication communication, and autonomous communication is performed without any particular synchronization between gates. Here, although collision of responses from a plurality of tags 200 is conceivable in tag ID acquisition, collision is handled by a plurality of anchors demodulating the responses.

4. Example of Function and Configuration of Automatic Ticket Examination System FIG. 31 is a block diagram illustrating an example of a function and configuration of an automatic ticket examination system. As illustrated in FIG. 31, the anchor 100 is connected to the server 1000. The server 1000 includes a transmission processing unit 1100, the reception processing unit 1200, a positioning unit 1300, an authentication unit 1400, a gate control unit 1500, a settlement processing unit 1600, the selection unit 1700, a database 1800, and an error detection unit 1900.

The transmission processing unit 1100 performs processing for transmitting transmission data to the tag 200 via the anchor 100. For example, the transmission processing unit 1100 performs processing for transmitting, for example, a distance measurement command, a tag ID acquisition command, a tag ID, and information for designating a slot to the tag 200. Furthermore, the transmission processing unit 1100 performs processing for modulating transmission data. The reception processing unit 1200 performs processing for receiving various pieces of data such as a response and a tag ID from the tag 200. Furthermore, the reception processing unit 1200 performs processing for demodulating the received data.

The positioning unit 1300 includes a first positioning unit 1310 and a second positioning unit 1320. The first positioning unit 1310 measures the position of the tag 200 by performing the above-described low-precision positioning. The second positioning unit 1320 acquires the position of the tag 200 by performing the above-described high-precision positioning.

The authentication unit 1400 authenticates the tag 200. A common method can be used as the authentication method. For example, if receiving information indicating type information of a railway company and balance amount information from the tag 200, the authentication unit 1400 determines that authentication is successful in a case where the received type information matches type information registered in the database 1600 of the server 1000 in advance and the balance amount is equal to or more than a certain level.

The gate control unit 1500 controls a gate 800 installed at the ticket examination area. In a case where the authentication of the authentication unit 1400 is successful, the gate control unit 1500 controls the gate 800 so that the gate 800 is opened. Furthermore, in a case where the authentication of the authentication unit 1400 fails, the gate control unit 1500 controls the gate 800 so that the gate 800 is closed.

In a case where the authentication of the authentication unit 1400 is successful, the settlement processing unit 1600 performs processing of subtracting a predetermined amount of money from the balance amount of the tag 200. The subtraction result is transmitted from the transmission processing unit 1100 to the tag 200 via the anchor 100. The selection unit 1700 performs processing of selecting the optimum anchor 100 at the time of performing positioning and authentication. Various pieces of information necessary on the side of the server 1000 are stored in the database 1600. The error detection unit 1900 detects whether or not the received data contains an error by a method such as parity check.

Furthermore, the tag 200 includes a transmission processing unit 210, a reception processing unit 220, an ID holding unit 230, an operation input unit 240, a balance amount information holding unit 250, and a display unit 260. The transmission processing unit 210 performs processing for transmitting transmission data to the anchor 100. For example, the transmission processing unit 210 performs processing for transmitting, for example, a response to a distance measurement command, a tag ID, and balance amount information to the anchor 100. Furthermore, the transmission processing unit 210 performs processing for modulating transmission data. The reception processing unit 220 performs processing for receiving, for example, a distance measurement command, a tag ID acquisition command, a tag ID, information for designating a slot, and balance amount information after settlement from the anchor 100. Furthermore, the reception processing unit 210 performs processing for demodulating the received data.

The ID holding unit 230 is a memory that holds the tag ID of the tag. Furthermore, the ID holding unit 230 holds various pieces of other information. The operation input unit 240 includes, for example, a touch sensor. Operation information from a user is input to the operation input unit 240.

The balance amount information holding unit 250 is a memory that holds information regarding a balance amount. The display unit 260 includes, for example, a liquid crystal display.

Note that the components of the server 1000 and the tag 200 illustrated in FIG. 31 can include hardware (circuit) or a central arithmetic processing apparatus such as a CPU and software (program) for causing the central arithmetic processing apparatus to function.

5. Further Variations of Embodiment

Further variations will be described on the basis of the above-described embodiment.

5.1. Application to Other than Ticket Examination Area

Although, in the above description, a system of a ticket examination area has been basically described, the embodiment relates to positioning in, for example, a station yard and the like, and can be applied to grasp, for example, flow of people. In this case, the tag 200 may receive a command at the ticket examination area during processing of a positioning command for a station yard. In the case, ticket examination processing which needs speed is assumed to be delayed. Therefore, it is desirable that the positioning command at the ticket examination area is separated from a positioning command system at another place (station yard or vehicle) and the priority of command processing at the ticket examination area is increased. This enables smooth passing through the ticket examination area even during positioning for the station yard.

Figure 32:
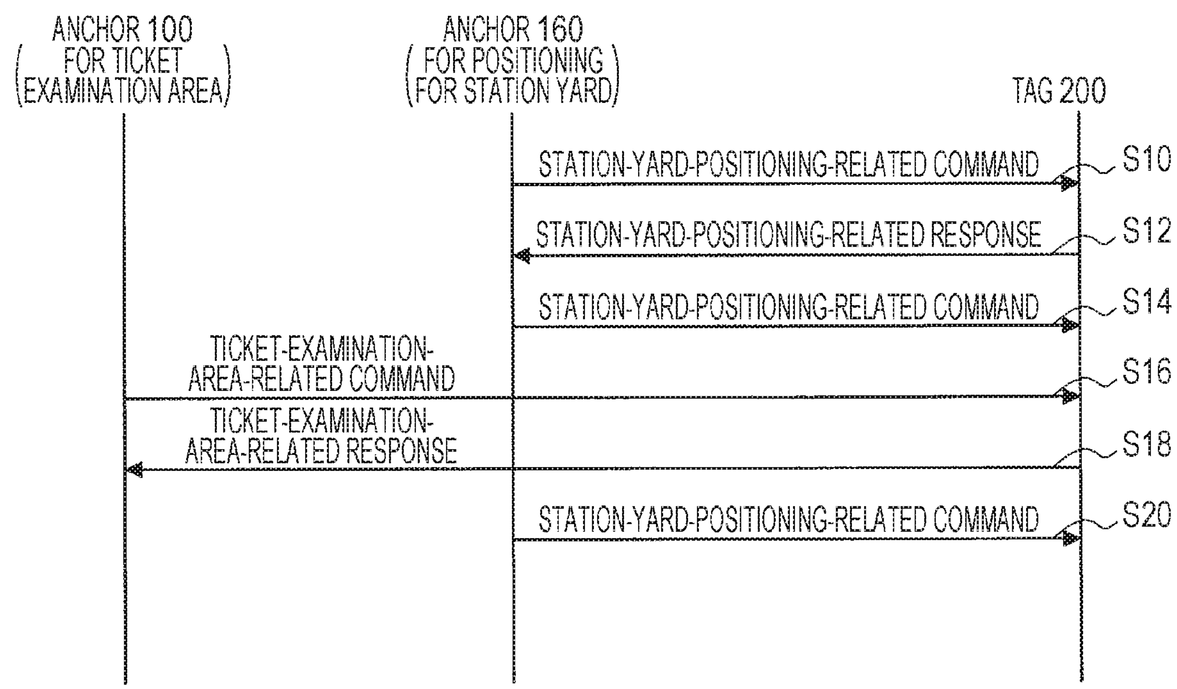
FIG. 32 is a schematic diagram illustrating an example in which an anchor for a ticket examination area and an anchor 160 for positioning for a station yard are provided as anchors.

Specifically, as illustrated in FIG. 32, the anchor 100 for a ticket examination area and an anchor 160 for positioning for a station yard are provided as anchors. In Steps S10, S12, S14, and S20, communication is performed between the anchor 160 for positioning for a station yard and the tag 200. A response from the tag 200 is transmitted to a command from the anchor 160.

In contrast, in a case where a tag 200 command is transmitted from the anchor 100 for a ticket examination area in Step S16, communication between the anchor 160 and the tag 200 is temporarily stopped, and a response is transmitted from the tag 200 to the anchor 100 in Step S18. In this way, in a case where a ticket-examination-area-related command is received, processing of a command for positioning for a station yard is stopped, and priority is given to processing of the ticket-examination-area-related command. That is, in a case where a ticket-examination-area-related command is received, a station-yard-positioning-related command is not received for the following certain period of time. Raising a priority of command processing for a ticket examination area enables smooth passage through the ticket examination area even during positioning for a station yard.

5.2. Example of Performing Positioning Calculation in Parallel with Command Transmission Although, in the above-described embodiment, the six anchors 110, 112, 114, 116, 118, and 120 perform positioning, not all the anchors 110, 112, 114, 116, 118, and 120 are required to perform positioning calculation after receiving a response from the tag 200. Positioning is basically possible as long as three pieces of distance measurement information can be used. Once three anchors collect distance measurement information, positioning calculation is sequentially performed in parallel with command transmission as illustrated in FIG. 33. This effectively reduces a period of time.

The sequence illustrated on the left of FIG. 33 illustrates a case where positioning calculation for the tag 200 is performed after the six anchors 110, 112, 114, 116, 118, and 120 receive a response from the tag 200 by the above-described approach. In contrast, the sequence illustrated on the right of FIG. 33 illustrates an example in which, if the three anchors 110, 112, and 114 receive a response, positioning calculation is sequentially performed between distance measurement sequences of the remaining three anchors 116, 118, and 120 on the basis of the received information. This can reduce a period of time until positioning calculation is completed.

5.3. Example in which State Transition of Tag is Restored

In a case where the above-described approach of collecting tag IDs is used, for example, a gate is closed due to, for example, insufficient balance of the tag 200, and a person holding the tag 200 may ask for handling at the counter 150. In this case, it is assumed that, since the tag 200 has been subject to state transition so as not to respond to a tag ID acquisition command as described above, a tag ID cannot be acquired at the counter 150, and communication cannot be performed.

Figure 34:
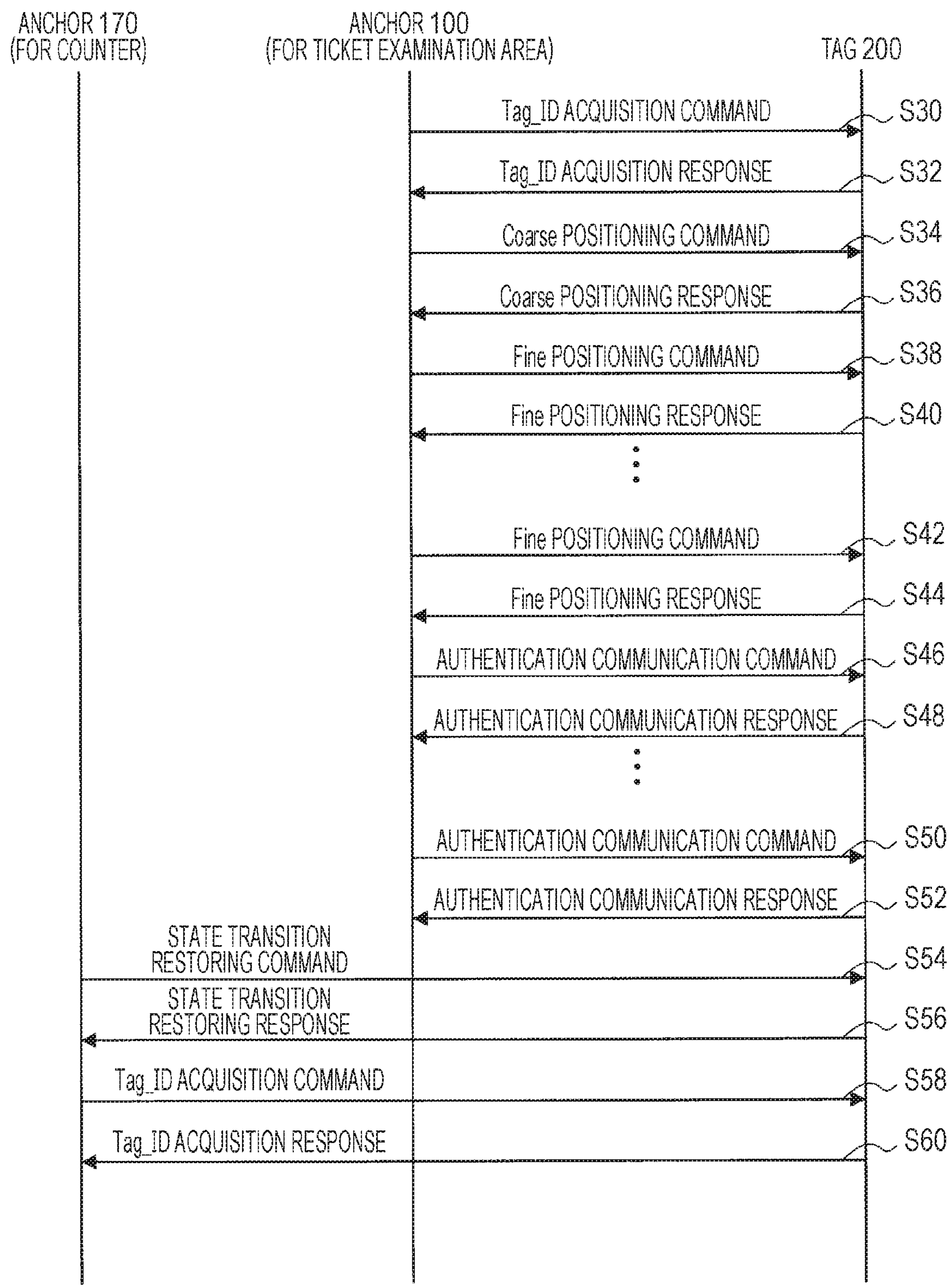
FIG. 34 is a schematic diagram illustrating an example in which state transition of a tag is restored.

For this reason, first, a command for restoring a transition state to an original state is transmitted in communication at the counter 150 (including, for example, a charging machine). Furthermore, the tag 200 is made to respond to the command even after the state transition. Specifically, as illustrated in FIG. 34, in a case where a series of pieces of processing of tag ID acquisition, low-precision positioning, high-precision positioning, and authentication was performed in Steps S30 to S52 and handling is performed at the counter 150 due to, for example, insufficient balance of the tag 200, a state transition restoring command is transmitted from an anchor 170 for the counter to the tag 200 in Step S54. The tag 200 that has received the state transition restoring command transmits a state transition restoring response to the anchor 170 in Step S56. This causes a tag ID acquisition command to be transmitted from the anchor 170 to the tag 200 in Step S58, and causes a tag ID acquisition response to be transmitted from the tag 200 to the anchor 170 in Step S60. The tag ID acquisition response includes a tag ID. Since the above-described operation restores the state transition of the tag 200, the anchor 170 can acquire the tag ID of the tag 200, and perform the subsequent processing.

5.4. Method of Subtracting Balance Amount of Tag after Passage Through Gate

According to the above-described embodiment, for example, only a condition of balance in the tag 200 equal to or more than an amount of money necessary for passing through a gate is required for opening the gate if communication is stable to some extent even if an anchor and the tag are spaced apart. In a common NFC ticket examination area, a communication distance is short, and a gate is opened after an amount of money necessary for passing through the ticket examination area is subtracted from the tag 200. In contrast, according to an approach of the embodiment, the anchor 100 may subtract an amount of money from the tag 200 after the gate is opened. This enables a gate to open more rapidly, and can eliminate congestion during, for example, rush hours.

Figure 35:
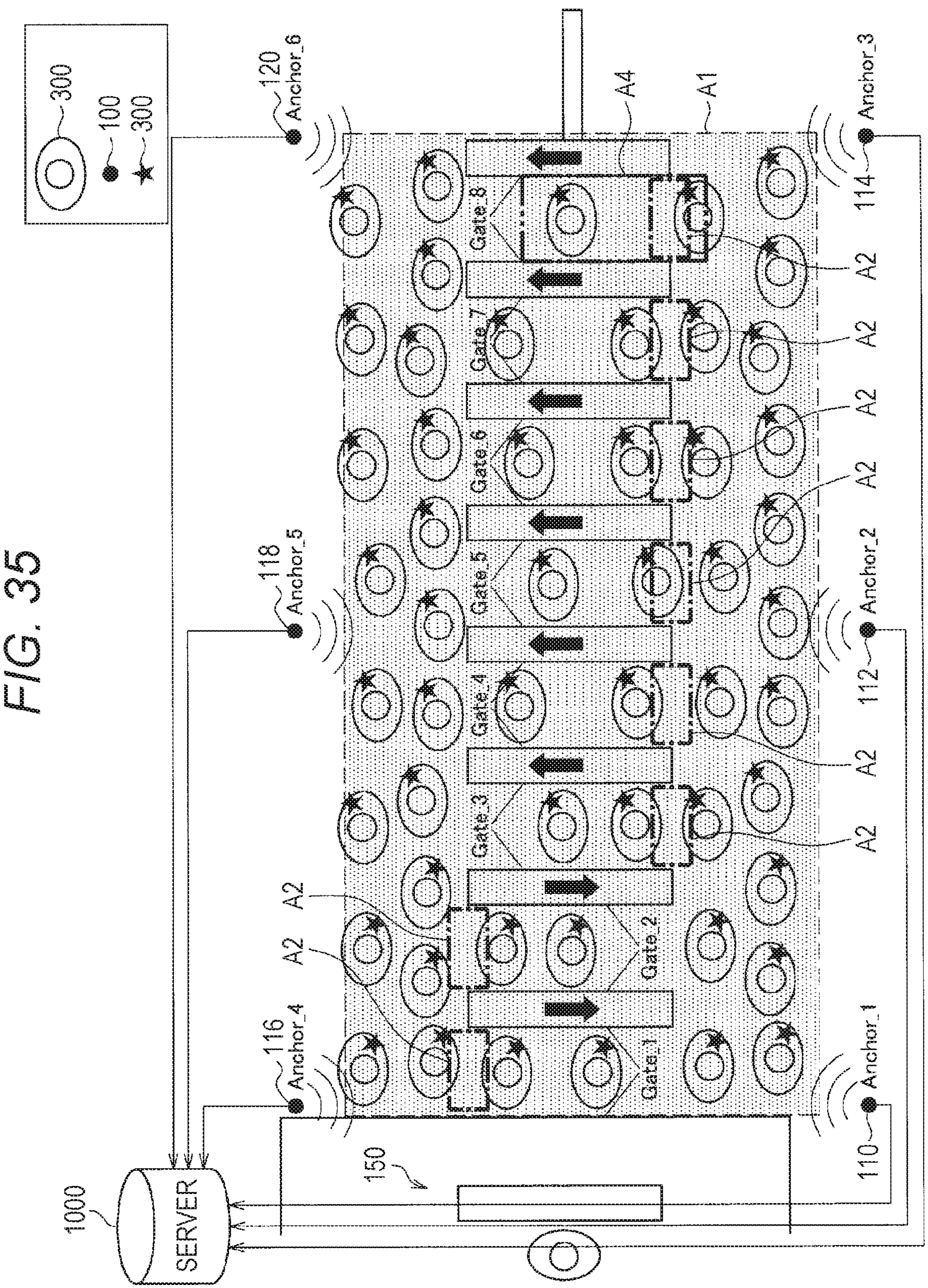
FIG. 35 is a schematic diagram illustrating an example in which a balance amount of a tag is subtracted after passage through a gate.

As illustrated in FIG. 35, in a case where a person passes through a gate 8, the balance of the tag 200 is confirmed until before the tag 200 passes through a range of a region A4 indicated by a two-dot dashed line at the time of authentication at an anchor, and an amount of money is subtracted after the person pass through the gate. This smooths the flow of people passing through the gate, and can reliably reduce congestion.

5.5. Measure for Preventing Double Charge

In a case where a user has the two tags 200 at the time of passing through a ticket examination area and it is unclear from which tag 200 an amount of money is subtracted, the amount of money may be subtracted from the tag 200 that the user does not intend. In order to prevent the situation, the user can turn a communication function of the tag 200 by UWB on/off by performing operation from the operation input unit 240 of the tag 200. FIG. 36 illustrates a case where the communication function is turned on/off by an operation from a touch panel 242 and a case where the communication function is turned on/off by an operation of a mechanical switch 244 provided on the tag 200.

Furthermore, as illustrated in FIG. 37, a method of collectively managing a balance amount on a server 600 can be adopted. In the method, the balance amount is not recorded in each tag 200, and the balance amount is recorded in the server 600 of a cloud. In FIG. 37, the server 600 side can recognize that the same owner has an ID of the tag 200 (Tag_1) and that of a tag 202 (Tag_2) on the basis of the tag IDs. For this reason, the server side holds, in advance, a table for associating a tag ID and an owner. Then, for example, in a case where IDs of the same person are acquired within a specific period of time, subtraction is not performed twice. In this case, the anchor 100 may acquire only a tag ID without performing authentication communication.

Furthermore, in a case where a user has two tags with different applications and one tag that the user does not intend is caught by an anchor, authentication may fail and a gate may be closed. For this reason, the application ID is designated by a tag ID acquisition command, which is the first command.

Figure 38:
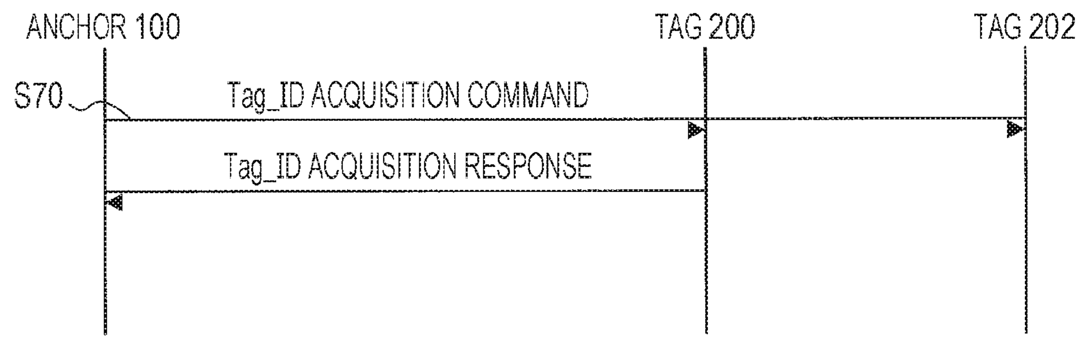
FIG. 38 is a schematic diagram illustrating an example in which an application ID is added to a tag ID acquisition command.

Specifically, at the time when a tag ID acquisition command is transmitted from the anchor 100 to the tags 200 and 202 in Step S70 as illustrated in FIG. 38, an application ID for designating an application is added to the tag ID acquisition command. This enables the tag 200, which an application ID matches, among the tags 200 and 202 that have received the tag ID acquisition command to return a response.

Furthermore, even if only one tag 200 is held, in a case where the tag 200 has two applications, payment can be made by either of the two applications on the side of the ticket examination area, and either of the two application IDs has been transmitted to the tag 200, it is assumed that an amount of money is subtracted from an application that the user does not intend. In such a case, activation and deactivation of an application of the tag 200 are made possible by operating the operation input unit 240.

Furthermore, in order to prevent an amount of money from being subtracted from the tag 200 twice in a case where a person slowly passes through the ticket examination area, in a case where the position of the same tag 200 is detected in the same place within a certain period of time, authentication communication is not performed. Specifically, in a case where the same tag 200 is detected twice within a certain period of time in the region A2 surrounded by the dot dashed line illustrated in FIG. 11, the second authentication communication is not performed.

Furthermore, a sensor for detecting a person may be provided at the ticket examination area, and once authentication is performed, high-precision positioning and authentication communication is not required to be performed until the person exits the ticket examination area. In this case, after performing the authentication communication, communication to the tag 200 held by the person is not performed until the person is recognized to exit the ticket examination area by the sensor at the ticket examination area.

Furthermore, entry to or exit from the ticket examination area is recorded. In a case of sequential "entry" to "entry" (or "exit" to "exit"), the second entry or exit is ignored for a certain period of time, and authentication is not performed. This method can be applied to the case where, although subtraction has been performed at the ticket examination area, a person is not aware of the fact, and the person tries to pass through another ticket examination area. In a case of the ID management type as illustrated in FIG. 37, if the same IDs are acquired within a certain period of time, the second subtraction of an amount of money is not performed.

Figure 39:
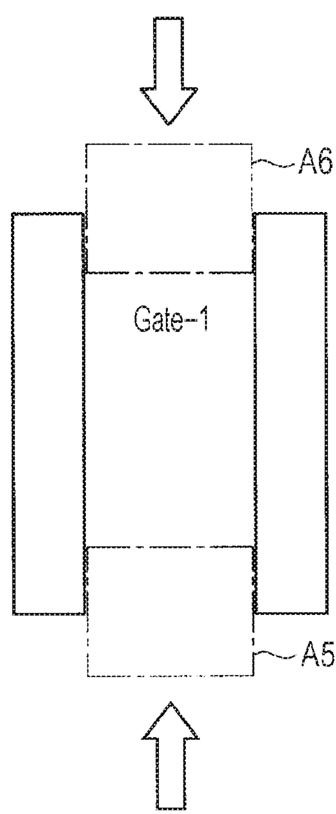
FIG. 39 is a schematic diagram illustrating a method of preventing two times of subtractions of a balance after position detection on the opposite side of a ticket examination area.

Furthermore, in a case where a person slowly passes through the ticket examination area that the person can enter from both directions as illustrated in FIG. 39, position detection is performed on the opposite side, and subtraction from a balance may be performed twice. Therefore, in a case where the same tag IDs are detected, the anchor 100 does not perform authentication communication with the tag 200. For example, the case corresponds to a case, in FIG. 39, where an amount of money is subtracted at the time when the tag 200 is positioned in a region A5 surrounded by a dot dashed line and then the tag 200 is positioned in a region surrounded by a dot dashed line A6. In this case, in a case where the same tag IDs are detected in the two regions A5 and A6 within a certain period of time, authentication communication is not performed in the region A6 where the tag ID is detected later.

Furthermore, in a case where a user holds both a card-type device such as Suica and the tag 200 and the user forgets that he/she holds the tag 200, if the user holds the card-type device over a ticket examination machine, subtraction is performed also from the tag 200. Therefore, in a case where the tag 200 is detected, the ticket examination side deactivates communication of a reader/writer with Suica. If the ticket examination side handles (charges) both Suica or a ticket and the tag 200 at the same time, an entry record of the tag 200 is deleted in a case of entry. Furthermore, in a case of exit, the amount of money is returned to the tag 200.

5.6. Countermeasure Against Reflected Wave of UWB

Figure 40:
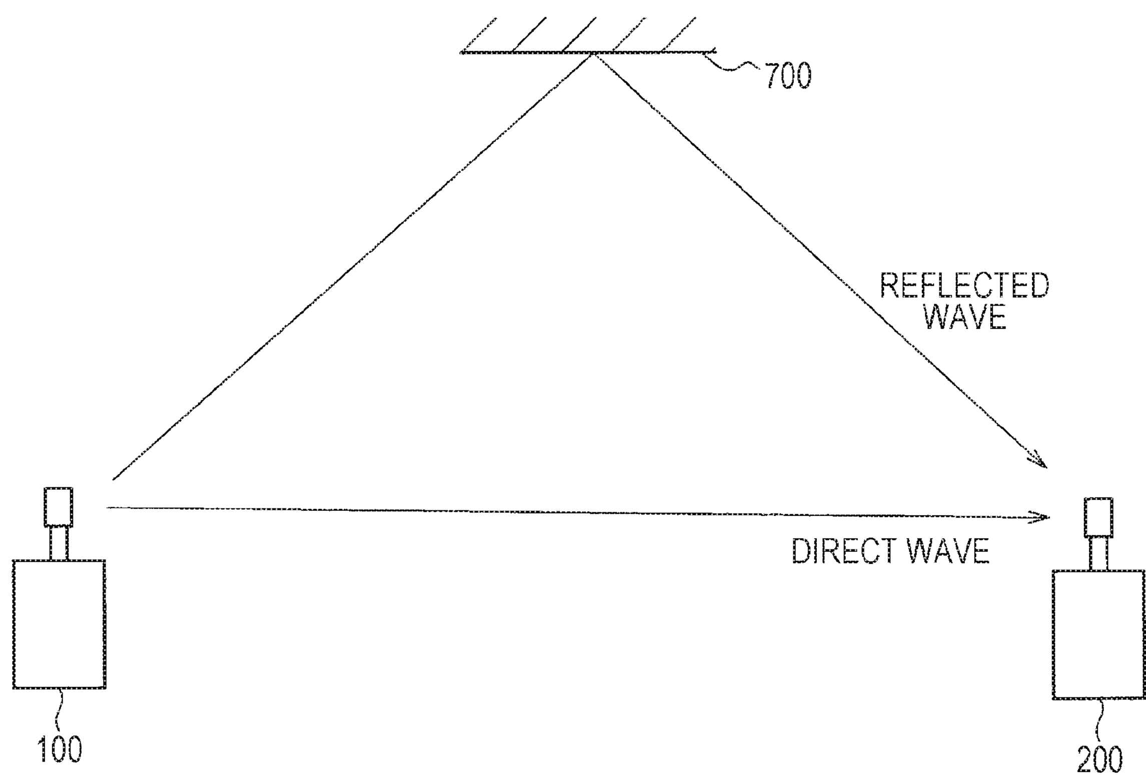
FIG. 40 is a schematic diagram illustrating a direct wave and a reflected wave in a case where an anchor and a tag communicate with each other.

Here, a countermeasure against a reflected wave of UWB will be described. UWB has a characteristic of being weak to reflection. In a case where the distance difference between a reflected wave and a direct wave matches a value obtained by multiplying a bit rate and the light speed c together, normal communication may be made impossible. FIG. 40 is a schematic diagram illustrating the direct wave and the reflected wave in a case where the anchor 100 and the tag 200 communicate with each other. The direct wave is directly transferred from the anchor 100 to the tag 200, whereas the reflected wave is reflected by a wall 700 and transferred to the tag 200.

FIG. 41 illustrates direct waves and reflected waves received by the tag 200 in a case where the anchor 100 transmits "1", "0", "1", and "0" as transmission data. As illustrated in FIG. 40, the transfer path of the reflected wave is longer than that of the direct wave. For this reason, as illustrated in FIG. 41, the reflected wave is received by the tag 200 with the delay of delay time $\Delta t$ behind the direct wave. Therefore, as illustrated in FIG. 41, the reception waveform to be received by the tag 200 is obtained by adding the direct wave and the reflected wave. Here, in a case where the delay time $\Delta t$ matches a bit rate, as illustrated in FIG. 41, reception data determined from the reception waveform is "1", "1", "1", and "1", and an error occurs in the reception data.

As illustrated in FIG. 41, in a case where the difference between the transfer distance of the reflected wave and that of the direct wave is defined as $\Delta d$, $\Delta t$ can be obtained by dividing $\Delta d$ by the light speed. For example, in a case of a bit rate of 50 [Mbps], $\Delta d$ is approximately 6 m. Therefore, in a case of a bit rate of 50 [Mbps], an error occurs in reception data in an environment where $\Delta d$ is 6 m due to a wall near the ticket examination area.

Since a reflected wave is settled by space and antenna arrangement to some extent, changing the reflected wave by using a system of, for example, a ticket examination area is unrealistic. For this reason, in order to overcome this weak point on the protocol side, occurrence of a communication error in a reflected wave is assumed, the same communication is performed multiple times, and a bit rate is changed for each communication. This enables accurate acquisition of reception data.

In contrast, a plurality of bit rate demodulators provided in parallel on the side of a receiver increases circuit scale. For this reason, in the embodiment, the bit rate of data transmitted/received between the anchor 100 and the tag 200 is made changeable, and the bit rate of data to be transmitted thereafter is written in a packet header. Therefore, reception data can be demodulated without an error by performing demodulation on the basis of the bit rate that has been written in the packet header at the time when the reception side demodulates the reception data.

In contrast, in relation to the bit rate of the packet header, the difference $\Delta d$ between the transfer distance of a reflected wave and that of the direct wave is set to a distance impossible in a normal state. As described above, in a case of a bit rate of 50 [Mbps], $\Delta d$ is approximately 6 m. Furthermore, in a case of a bit rate of 100 [Mbps], $\Delta d$ is approximately 3 m. In one example, the bit rate of the packet header is set to a value by which $\Delta d$ is made to approximately 100 m. The difference $\Delta d$ between the transfer distance of a direct wave and that of a reflected wave of 100 m in the ticket examination area cannot be assumed. Occurrence of an error in reception data at the time of receiving the packet header can be inhibited.

Furthermore, weakening the output of RF can inhibit the influence of a reflected wave. Thus, the influence of a reflected wave can be inhibited by changing the output of RF each time a command from an anchor and a response from a tag are transmitted. Furthermore, the RF output at the time of response transmission from a tag may be able to be set by a command from an anchor.

5.7. Countermeasure Against Distance Measurement Error

Figure 42:
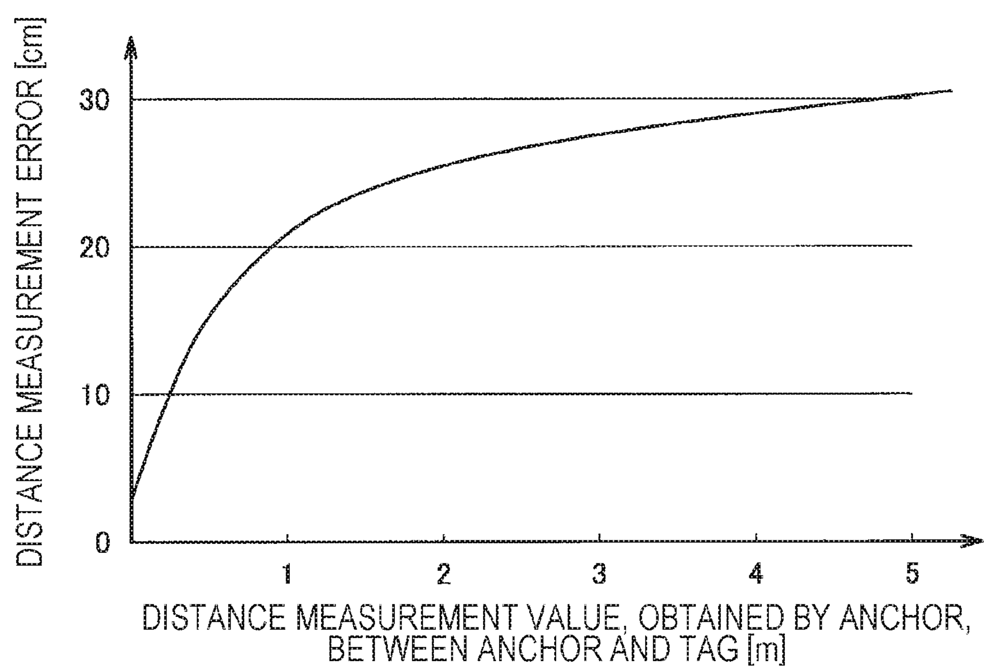
FIG. 42 is a characteristic diagram illustrating the relation between a distance measurement value, determined by an anchor, between the anchor and a tag and a distance measurement error.

A distance measurement error (error between an actual distance and a distance measurement value) at the time of measuring the distance between the anchor 100 and the tag 200 is increased as the distance between the anchor 100 and the tag 200 is increased. FIG. 42 is a characteristic diagram illustrating the relation between a distance measurement value (horizontal axis), obtained by the anchor 100, between the anchor 100 and the tag 200 and a distance measurement error (vertical axis). The distance measurement error depends on hardware characteristics, and reducing the distance measurement error is difficult to some extent.

For this reason, characteristics as illustrated in FIG. 42 are grasped in advance, correction according to a distance measurement value is performed, and positioning calculation is performed by using the corrected value. For example, in FIG. 42, in a case of a distance measurement value of 0.2 m, the distance measurement value is corrected by 5 cm, and in a case of a distance measurement value of 5 m, the distance measurement value is corrected by 30 cm. This inhibits distance measurement error, and enables high-precision positioning.

5.8. Policy for Improving Positioning Precision

In high-precision positioning (fine positioning), it is conceivable to perform communication for positioning multiple times as illustrated in FIG. 16 and use an average value of distance measurement values for positioning calculation at the time of measuring the distance between the anchor 100 and the tag 200. At that time, in a case where the communication for distance measurement is not successful due to the influence of, for example, noise and the number of communications is small, it is predictable that an error of a distance measurement value is increased since a population parameter for averaging is decreased. In relation to this problem, the above-described problem can be solved by removing a distance measurement value obtained in a case where the number of communications is small from targets of positioning calculation.

Although the preferred embodiment of the disclosure has been described in detail above with reference to the accompanying drawings, the technical scope of the disclosure is not limited to such an example. It is obvious that a person having ordinary skill in the art of the disclosure can arrive at various alternations or modifications within the scope of the technical ideas set forth in the claims. These alternations or modifications are understood to naturally fall within the technical scope of the disclosure.

Furthermore, the effects described herein are merely illustrative or exemplary, and not limitative. That is, the technique according to the disclosure may have other effects that are obvious to a skilled person from the description of the specification, together with or in place of the above-described effects.

Note that, the configurations as described below also fall within the technical scope of the disclosure.

(1) A gate apparatus including:

a positioning unit that measures positions of a plurality of wireless communication terminals; and an authentication unit that performs authentication for determining whether or not each of the wireless communication terminals is permitted to pass through a gate on the basis of each of the positions of each of the wireless communication terminals which have been measured by the positioning unit.

(2) The gate apparatus according to (1), in which the positioning unit measures a position of each of the wireless communication terminals by positioning technology using pulse communication.

(3) The gate apparatus according to (1), in which the authentication unit performs the authentication in a case where each of the wireless communication terminals is positioned in a predetermined range.

(4) The gate apparatus according to (1), further including a plurality of wireless communication apparatuses disposed at different positions, the wireless communication apparatuses communicating with each of the wireless communication terminals for the positioning and the authentication, in which the positioning unit measures a position of each of the wireless communication terminals on the basis of a period of time from transmission of a positioning command to each of the wireless communication terminals to reception of a response from each of the wireless communication terminals to the positioning command.

(5) The gate apparatus according to (4), in which the positioning unit includes a first positioning unit that measures a position of each of the wireless communication terminals on the basis of one positioning command that has been transmitted by each of the plurality of wireless communication apparatuses to each of the wireless communication terminals and the response to the one positioning command, and a second positioning unit that measures a position of each of the wireless communication terminals on the basis of a plurality of the positioning commands that has been transmitted by each of the plurality of wireless communication apparatuses to each of the wireless communication terminals and a plurality of the responses to the plurality of positioning commands, and the second positioning unit performs positioning for each of the wireless communication terminals which have been measured to be positioned in a predetermined range by the first positioning unit.

(6) The gate apparatus according to (5), in which the second positioning unit fixes a slot for receiving the response at a time of receiving the responses to the plurality of positioning commands.

(7) The gate apparatus according to (5), in which the plurality of wireless communication apparatuses acquires an identifier from each of the wireless communication terminals by transmitting an identifier acquisition command for acquiring the identifier for identifying each of the wireless communication terminals to each of the wireless communication terminals before the positioning unit measures a position of each of the wireless communication terminals, and transmits the identifier and timing information at a time of receiving the response together with the positioning command at a time when the first positioning unit measures a position of each of the wireless communication terminals.

(8) The gate apparatus according to (7), in which each of the plurality of wireless communication apparatuses transmits different pieces of timing information to each of the wireless communication terminals at a time when the first positioning unit measures a position of each of the wireless communication terminals.

(9) The gate apparatus according to (7), in which each of the wireless communication terminals that has received the identifier and the timing information together with the positioning command transmits the response on the basis of the received timing information in a case where the received identifier matches an identifier of each of the wireless communication terminals.

(10) The gate apparatus according to (4), further including a selection unit that selects each of the wireless communication apparatuses configured to perform the authentication from the plurality of wireless communication apparatuses on the basis of information that has been obtained at a time of demodulating information, the latter information having been received from each of the wireless communication terminals at a time of measuring a position of each of the wireless communication terminals for authentication to be performed by the authentication unit.

(11) The gate apparatus according to (7), in which the plurality of wireless communication apparatuses performs demodulation at a time of receiving the response or the identifier, an error detection unit that detects an error of the response is further provided, and the response, in which no error has been detected, among the responses received by the plurality of wireless communication apparatuses is determined as a final response.

(12) The gate apparatus according to (7), in which state transition is performed to each of the wireless communication terminals that has responded to the positioning command so that each of the wireless communication terminals does not respond to the identifier acquisition command transmitted from each of the wireless communication apparatuses for a certain period of time.

(13) The gate apparatus according to (12), in which a state transition restoring command is transmitted, the state transition restoring command restoring each of the wireless communication terminals that has been subject to the state transition from the state transition.

(14) The gate apparatus according to claim 7, in which, in a case where the identifier in the identifier acquisition command corresponds to each of the wireless communication terminals, each of the wireless communication terminals does not respond to the identifier acquisition command.

(15) The gate apparatus according to claim 7, in which the identifier is added to the positioning command only for a certain period of time, and the positioning command is transmitted to each of the wireless communication terminals.

(16) The gate apparatus according to any one of (1) to (15), in which a first command related to the gate and a second command not related to the gate are provided as positioning commands for measuring a position of each of the wireless communication terminals, and each of the wireless communication terminals responds to the first command by giving a higher priority to the first command than to the second command.

(17) The gate apparatus according to any one of (1) to (16), in which positioning at the positioning unit or authentication at the authentication unit is not performed while a person holding each of the wireless communication terminals passes through the gate on the basis of information obtained by a sensor that detects a person after authentication at the authentication unit is performed.

(18) The gate apparatus according to any one of (1) to (17), in which, in a case where each of the wireless communication terminals is authenticated, communication with another terminal separately held by a person who holds each of the wireless communication terminals is deactivated.

(19) The gate apparatus according to any one of (1) to (19), in which communication for the authentication is started by using a fact that each of the wireless communication terminals enters a specific range outside the gate as a trigger.

(20) A method in a gate apparatus, including:

measuring positions of a plurality of wireless communication terminals; and performing authentication for determining whether or not each of the wireless communication terminals is permitted to pass through a gate on the basis of each of the positions of each of the wireless communication terminals which have been measured.

REFERENCE SIGNS LIST

100 Anchor
1300 Positioning unit
1310 First positioning unit
1320 Second positioning unit
1400 Authentication unit
1700 Selection unit
1900 Error detection unit

The invention claimed is:

1. A gate apparatus, comprising:

a plurality of wireless communication apparatuses at different positions, wherein the plurality of wireless communication apparatuses is configured to communicate with each of a plurality of wireless communication terminals;

a positioning unit configured to measure a position of each of the plurality of wireless communication terminals based on a period of time from transmission of a positioning command to each of the plurality of wireless communication terminals to reception of a response from each of the plurality of wireless communication terminals to the positioning command; and an authentication unit configured to execute authentication to determine a permission for each of the plurality of wireless communication terminals to pass through a gate, wherein the authentication is executed based on the measured position of each of the plurality of wireless communication terminals.

2. The gate apparatus according to claim 1, wherein the positioning unit is further configured to measure the position of each of the plurality of wireless communication terminals by positioning technology using pulse communication.

3. The gate apparatus according to claim 1, wherein the authentication unit is further configured to execute, the authentication in a case where the position of each of the plurality of wireless communication terminals is in a determined range.

4. The gate apparatus according to claim 1, wherein the positioning unit includes:

a first positioning unit configured to measure the position of each of the plurality of wireless communication terminals based on one positioning command transmitted by each of the plurality of wireless communication apparatuses to each of the plurality of wireless communication terminals and the response to the one positioning command; and a second positioning unit configured to measure the position of each of the plurality of wireless communication terminals based on a plurality of positioning commands transmitted by each of the plurality of wireless communication apparatuses to each of the plurality of wireless communication terminals and a plurality of responses to the plurality of positioning commands, and the second positioning unit configured to determine the position of each of the plurality of wireless communication terminals which have been measured to be positioned in a determined range by the first positioning unit.

5. The gate apparatus according to claim 4, wherein the second positioning unit is further configured to fix a slot for to receive each response of the plurality of responses at a time of reception of the plurality of responses to the plurality of positioning commands.

6. The gate apparatus according to claim 4, wherein the plurality of wireless communication apparatuses is further configured to:

acquire an identifier from each of the plurality of wireless communication terminals by transmission of an identifier acquisition command to each of the plurality of wireless communication terminals before the measurement of the position of each of the plurality of wireless communication terminals, wherein the identifier identifies each of the plurality of wireless communication terminals, and transmit the identifier and timing information at a time of reception of the response together with the positioning command at a time of the measurement of the position of each of the plurality of wireless communication terminals.

7. The gate apparatus according to claim 6, wherein each of the plurality of wireless communication apparatuses is further configured to transmit a plurality of pieces of timing information to each of the plurality of wireless communication terminals at the time of the measurement of the position of each of the plurality of wireless communication terminals.

8. The gate apparatus according to claim 6, wherein each of the plurality of wireless communication terminals:

receives the identifier and the timing information together with the positioning command; and transmits the response based on the timing information in a case where the received identifier matches an identifier of each of the plurality of wireless communication terminals.

9. The gate apparatus according to claim 1, further comprising a selection unit configured to select each of the plurality of wireless communication apparatuses configured to execute the authentication from the plurality of wireless communication apparatuses based on information obtained at a time of demodulating information, wherein the information is received from each of the plurality of wireless communication terminals at a time of the measurement of the position of each of the plurality of wireless communication terminals.

10. The gate apparatus according to claim 6, wherein the plurality of wireless communication apparatuses is further configured to execute demodulation at a time of receiving reception of one of the response or the identifier, and the gate apparatus further comprises:

an error detection unit configured to:

detect an error of the response; and determine a final response, wherein the final response is the response in which no error has been detected among the plurality of responses.

11. The gate apparatus according to claim 6, wherein state transition is performed to each of the plurality of wireless communication terminals based on the response of each of the plurality of wireless communication terminals to the positioning command so that each of the plurality of wireless communication terminals does not respond to the identifier acquisition command transmitted from each of the plurality of wireless communication apparatuses for a certain determined period of time.

12. The gate apparatus according to claim 11, wherein at least one of the plurality of wireless communication apparatuses is further configured to transmit a state transition restoring command, and the state transition restoring command restores each of the plurality of wireless communication terminals that has been subject to the state transition from the state transition.

13. The gate apparatus according to claim 6, wherein, in a case the identifier in the identifier acquisition command corresponds to each of the plurality of wireless communication terminals, each of the plurality of wireless communication terminals does not respond to the identifier acquisition command.

14. The gate apparatus according to claim 6, wherein the identifier is added to the positioning command for a determined period of time, and the positioning command is transmitted to each of the plurality of wireless communication terminals.

15. The gate apparatus according to claim 1, wherein the positioning command comprises of a first command related to the gate and a second command not related to the gate are provided as positioning commands for the measurement of the position of each of the plurality of wireless communication terminals, and each of the plurality of wireless communication terminals gives a higher priority to the first command than to the second command to respond the first command.

16. The gate apparatus according to claim 1, wherein the measurement at the positioning unit or the authentication at the authentication unit is not performed in a case a person holding each of the plurality of wireless communication terminals passes through the gate based on information obtained by a sensor that detects the person after the authentication at the authentication unit.

17. The gate apparatus according to claim 1, wherein, in a case where each of the plurality of wireless communication terminals is authenticated, communication with a specific terminal of the plurality of wireless communication terminals separately held by a person who holds each of the plurality of wireless communication terminals is deactivated.

18. The gate apparatus according to claim 1, wherein communication for the authentication is started based on a trigger, and the trigger is entry of each of the plurality of wireless communication terminals in a determined range outside the gate.

19. A method, comprising:

in a gate apparatus:

communicating, by a plurality of wireless communication apparatuses at different positions, with each of a plurality of wireless communication terminals;

measuring a position of the plurality of wireless communication terminals based on a period of time from transmission of a positioning command to each of the plurality of wireless communication terminals to reception of a response from each of the plurality of wireless communication terminals to the positioning command; and executing authentication for determining a permission for each of the plurality of wireless communication terminals to pass through a gate, wherein the authentication is executed based on the measured position of each of the plurality of wireless communication terminals.

20. A gate apparatus, comprising:

a positioning unit configured to measure a position of each of a plurality of wireless communication terminals; and an authentication unit configured to execute authentication to determine a permission for each of the plurality of wireless communication terminals to pass through a gate, wherein the authentication is executed based on each of the measured position of each of the plurality of wireless communication terminals, wherein a first command related to the gate and a second command not related to the gate are provided as positioning commands for the measurement of the position of each of the plurality of wireless communication terminals, and each of the plurality of wireless communication terminals gives a higher priority to the first command than to the second command to respond to the first command.

* * * * *